(12) United States Patent
Ito

(10) Patent No.: US 7,228,311 B2
(45) Date of Patent: Jun. 5, 2007

(54) CREATION METHOD OF TABLE, CREATION APPARATUS, CREATION PROGRAM AND PROGRAM STORAGE MEDIUM

(75) Inventor: Toru Ito, Tokyo (JP)

(73) Assignee: Netcomsec Co., Ltd., Tokyo (JP)

( * ) Notice: Subject to any disclaimer, the term of this patent is extended or adjusted under 35 U.S.C. 154(b) by 524 days.

(21) Appl. No.: 10/796,034

(22) Filed: Mar. 10, 2004

(65) Prior Publication Data
US 2004/0243621 A1    Dec. 2, 2004

(30) Foreign Application Priority Data
Mar. 11, 2003    (JP) ............................ 2003-065496

(51) Int. Cl.
*G06F 17/00*    (2006.01)
(52) U.S. Cl. .................. 707/102; 358/515; 358/1.9; 358/1.8; 358/462; 358/518
(58) Field of Classification Search .............. 707/102
See application file for complete search history.

(56) References Cited

U.S. PATENT DOCUMENTS 4,364,182 A * 12/1982 Jones ........................... 33/567
5,838,794 A * 11/1998 Mittenthal .................... 380/28
5,838,796 A * 11/1998 Mittenthal .................... 380/28

FOREIGN PATENT DOCUMENTS

| JP | 2000285101 A | * | 10/2000 |
| JP | 2001195388 A | * | 7/2001 |
| JP | 2002247027 A | * | 8/2002 |

* cited by examiner

*Primary Examiner*—Don Wong
*Assistant Examiner*—Binh Van Ho
(74) *Attorney, Agent, or Firm*—Oliff & Berridge, PLC

(57) ABSTRACT

A method for creating and an apparatus for creating a four-dimensional or higher table. A dimension number m and an order n are set, and a permutation of a symbol of n elements and a selecting sequence in accordance with this permutation are determined and set. When one of the n symbols is set as an array element at table position, this setting is started from a first position of all reference axes, and is successively performed to a final position of all the reference axes, and at each position, a symbol unique to each axis direction is selected in the selecting sequence, and at each position of the table, the substitution of a selectable symbol lower in the selecting sequence than the symbol of the determined array element at a position one before an arbitrary position is performed and selection determination is continued.

15 Claims, 11 Drawing Sheets

Fig. 2

| | T |
|---|---|
| $K(1,1,1,1) = 0$ | $E(1,1,1,1)$ |
| $K(1,1,1,2) = 1$ | $E(1,1,1,2)$ |
| $K(1,1,2,1) = 2$ | $E(1,1,2,1)$ |
| $K(1,1,2,2) = 3$ | $E(1,1,2,2)$ |
| $K(1,2,1,1) = 4$ | $E(1,2,1,1)$ |
| $K(1,2,1,2) = 5$ | $E(1,2,1,2)$ |
| $K(1,2,2,1) = 6$ | $E(1,2,2,1)$ |
| $K(1,2,2,2) = 7$ | $E(1,2,2,2)$ |
| $K(2,1,1,1) = 8$ | $E(2,1,1,1)$ |
| $K(2,1,1,2) = 9$ | $E(2,1,1,2)$ |
| $K(2,1,2,1) = 10$ | $E(2,1,2,1)$ |
| $K(2,1,2,2) = 11$ | $E(2,1,2,2)$ |
| $K(2,2,1,1) = 12$ | $E(2,2,1,1)$ |
| $K(2,2,1,2) = 13$ | $E(2,2,1,2)$ |
| $K(2,2,2,1) = 14$ | $E(2,2,2,1)$ |
| $K(2,2,2,2) = 15$ | $E(2,2,2,2)$ |

Fig. 7

| 0 | 1 | 2 | 3 |
|---|---|---|---|
| 1 | 2 | 3 | 0 |
| 2 | 3 | 0 | 1 |
| 3 | 0 | 1 | 2 |

(a)

| 1 | 2 | 3 | 4 |
|---|---|---|---|
| 2 | 3 | 4 | 1 |
| 3 | 4 | 1 | 2 |
| 4 | 1 | 2 | 3 |

(b)

| a | b | c | d |
|---|---|---|---|
| b | c | d | a |
| c | d | a | b |
| d | a | b | c |

(c)

1 2 3 4 ← VALUE IN SEQUENCE OF 1 TO 4

IT IS ASSUMED THAT ARBITRARY VALUE FORMING LATIN SQUARE IS SET AS VALUE OF ELEMENT OF

↑
VALUE IN SEQUENCE
OF 1 TO 4

Fig. 9
Prior Art

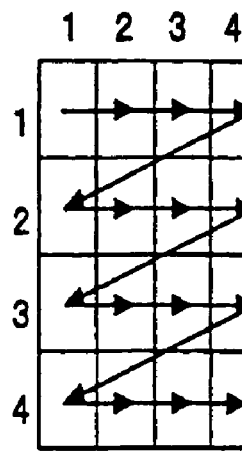

CREATION OF EACH ELEMENT IS PERFORMED IN SEQUENCE OF FIRST ROW AND FIRST COLUMN, FIRST ROW AND SECOND COLUMN, ······, FOURTH ROW AND THIRD COLUMN, AND FOURTH ROW AND FOURTH COLUMN

CREATION METHOD IN COLUMN DIRECTION (a)

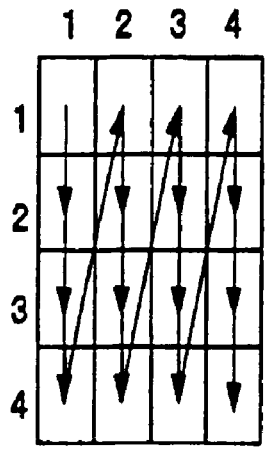

CREATION OF EACH ELEMENT IS PERFORMED IN SEQUENCE OF FIRST ROW AND FIRST COLUMN, SECOND ROW AND FIRST COLUMN, ······, THIRD ROW AND FOURTH COLUMN, AND FOURTH ROW AND FOURTH COLUMN

CREATION METHOD IN ROW DIRECTON (b)

Fig. 11

Prior Art

CREATION METHOD OF TABLE, CREATION APPARATUS, CREATION PROGRAM AND PROGRAM STORAGE MEDIUM

BACKGROUND OF THE INVENTION

1. Field of the Invention

The present invention relates to a creation method of a table, a creation apparatus, a creation program and a creation program storage medium, and particularly to a creation method of a conversion table in code conversion or a code book table, or a table used for a layout of experimental design or the like, a creation apparatus, a creation program as software for its operation, and a storage medium of the program.

2. Related Art

First, the basic property of a Latin square and a Latin cube. The Latin square is conventionally known (for example, see non-patent document 1, non-patent document 2, non-patent document 3). That is, each element of a set A (a1, . . . , an) consisting of n symbols is used n times, and the $n^2$ elements in total are arranged as a square having n rows and n columns, and when each element of A appears once on each row and each column, it is called a Latin square on A or an n-order Latin square.

When both the first row and the first column are natural permutations, it is called a reduced or standard Latin square. When the number thereof is denoted by L2(n), the total number of the n-order Latin squares becomes $n! \cdot (n-1)! \cdot L2(n)$. When n is 9 or less, that is, n is 1 to 9, L2(n) becomes as follows.

L2(1)=1
L2(2)=1
L2(3)=1
L2(4)=4
L2(5)=56
L2(6)=9,408
L2(7)=16,942,080
L2(8)=535,281,401,856
L2(9)=377,597,570,964,258,816.

Besides, the basic form of a four-order Latin square in the case of A={1, 2, 3, 4} becomes as shown in FIG. 7(*b*), and since any of array elements on the first row and the first column are ascending sequences (natural permutations) of 1 to 4, it belongs to the standard Latin square shown in FIG. 8. Incidentally, in FIG. 8, it is assumed that a value of an array element of (•) is set to an arbitrary value of 1 to 4 forming the Latin square. A regular creation method of the above two-dimensional Latin square is opened to the public by the present inventor (see patent document 1).

Incidentally, the basic form of a four-order Latin square in the case of A={0, 1, 2, 3} is as shown in FIG. 7(*a*). Besides, the symbol is not limited to a numeral, but may be an alphabet or another symbol, and when the alphabet of letters a to d are used as the symbols to form the set A={a, b, c, d}, the basic form of the four-order Latin square is as shown in FIG. 7(*c*).

According to the Latin square creation method disclosed in the patent document 1, a position of a first element of the Latin square to be created is made the first row and first column, the movement direction of a position of an element to be created is previously set to either one of a column direction in which it is moved in a direction indicated by an arrow in FIG. 9(*a*) and a row direction in which it is moved in a direction indicated by an arrow in FIG. 9(*b*), and each element is successively created.

Here, for example, in the case where each element is created in the column direction according to the patent document 1 at each position of four rows and four columns of the four-order standard Latin square on A={0, 1, 2, 3}, as shown in FIG. 10(*a*), after a value "0" of a first element is set at the first row and first column, when an element (symbol) is successively arranged along each row at each position so that it does not become the same symbol as an already determined array element at the former position in the same row and the same column, the element is regularly arranged in sequence shown in the drawings (b) to (p).

Besides, the above patent document 1 also discloses a method of creating a new Latin square from an existing Latin square. That is, a method is such that the order of the Latin square to be created, and permutations of symbols of the order, and a selecting sequence in accordance with the permutations are determined, a return is successively made along a row and a column from the final position of the row and the column of the existing Latin square to a position where a symbol lower in the selecting sequence than a symbol of an existing array element can be selected, and a symbol of an array element is successively selected at each position along the column or the row from that position to the final position so that it does not become the same symbol as an already determined array element at the former position in the same row and the same column.

According to this Latin square creation method, for example, a return is successively made from the final position at the fourth row and fourth column of an existing four-order Latin square shown in FIG. 11(*a*) to a position where a symbol "1" lower in the selecting sequence than a symbol "0" can be selected as shown in the drawing (b), the next symbol "1" is arranged at that position, and in the following, a symbol of an array element is successively selected at each position to the final position along a row or a column of the drawing so that it does not become the same symbol as an already determined array element at the former position in the same row and the same column, and each element is determined in the sequence shown in the drawings (c), (d), (e), (f) and (g), and finally, a new Latin square shown in the drawing (g) is created.

On the other hand, each element of a set A (m1, . . . , mn) consisting of n symbols is used n times, and the $n^3$ elements in total are arranged as a cube having n elements in each of three directions (X axis (vertical) direction, Y axis (horizontal) direction, Z axis (depth) direction), and when each element of A appears once on each direction, that is, when n n-order Latin squares which do not have the same value at the respective same positions are overlapped with each other, it is called a Latin cube on A or an n-order Latin cube.

A regular creation method of the three-dimensional Latin cube is invented by the present inventor and is opened to the public (see patent document 2). Although the number of standard Latin cubes was not opened to the public before the publication of the patent document 2, according to the patent document 2, when it is expressed as L3(n), the total number of the n-order Latin cubes is expressed as $n! \cdot (n-1)! \cdot (n-1)! \cdot L3(n)$. When n is 5 or less, the value of L3(n) is L3(1)=1, L3(2)=1, L3(3)=1, L3(4)=64, L3(5)=40246, and the total number of the Latin cubes in each order is 1 in first order, 2 in second order, 24 in third order, 55296 in fourth order, and 2781803520 in fifth order.

However, although the creation method and creation apparatus of the Latin square as the two-dimensional table, and the creation method and creation apparatus of the Latin cube as the three-dimensional table have been invented by the present inventor and are opened to the public in the patent document 1 and the patent document 2, a creation method and a creation apparatus of a similar table having four dimensions or higher are not known, its illustration is also difficult, and there is no generalized creation method independent of dimensions, and therefore, there has been a problem that the use value and use effect of a table can not be further raised.

[Non-Patent Document 1]

Edited by Japan Mathematical Society, "Iwanami Sugaku Jiten", third edition, Iwanami Shoten

[Non-Patent Document 2]

Koichi Yamamoto, "Various Phases of Latin Square", Surikagaku, Kabusikikaisha Science, 1979, June, Vol. 17, No. 6, p. 62-66

[Non-Patent Document 3]

Koihi Yamamoto, New Mathematics Lecture "Combinatorial Mathematics", Asakura Shoten

[Patent Document 1]

JP-A-10-105544

[Patent Document 2]

JP-A-2000-285101

SUMMARY OF THE INVENTION

Then, the invention is devised to solve the problem of the prior art described above, and has an object to provide a creation method of a table, a creation apparatus, a creation program, and a creation program storage medium, in which elements of a desired table having four or higher dimensions and an order are arranged in a memory of a computer, it can be regularly created in accordance with a specific method, the use range of the table is widened, and the use value and effect of the table can be remarkably raised.

In order to achieve the above object, a creation method of a table according to a first invention is a creation method of a table for searching for and creating an m-dimensional and n-order table in which on the basis of m (m is a natural number of 4 or larger) reference axes, a symbol A={a1, a2, . . . , an} of n (n is a natural number of 2 or larger) elements different from each other appears once in an axial direction of each of the m reference axes, and is characterized by comprising a first step of setting the dimension number m and the order n, and determining and setting a permutation of the symbol of the n elements and a selecting sequence in accordance with the permutation, a second step of, when one of the n elements is set as an array element at each position of the table, starting this setting from a first position of all the reference axes and successively performing it to a final position of all the reference axes, and selecting a symbol in the selecting sequence at each position so that it does not coincide with a symbol of an already determined array element at a line of former positions in each axial direction, and a third step of, when the symbol is selected in the selecting sequence at each position of the table so that it does not become coincident with the already determined array element at the line of the former positions in each axial direction, and when there is no symbol which can be selected at an arbitrary position, continuing selection and determination by replacing the symbol of the already determined array element at the position one before the arbitrary position by a selectable symbol lower in the selecting sequence than the symbol. A creation apparatus of a table, a creation program and a creation program storage medium according to a fourth, an eighth and an eleventh invention also have the same structure as the first invention.

In the first, the fourth, the eighth and the eleventh invention, the order n of the table T to be created is set, and the symbol a for the order n is set by determining the permutation and the selecting sequence in accordance with the permutation. The permutation of the symbol a and the selecting sequence in accordance with the permutation mean that for example, in the case where the order n is 3 and {1, 2, 3} is set as the symbol a, according to the symbol a, it is determined that 1→2→3 is made the permutation (natural permutation), and it is determined that a selection is made in sequence of 1→2→3. The symbol to be set is not particularly limited, and in addition to the above example, for example, numerals or characters such as (0, 1, 2) or (a, b, c) or what can be differentiated, such as color or shape, can be arbitrarily set.

The selection and determination of one symbol a as an array element E(*, *, . . . , *) to each position K (*, *, . . . , *) of the table T is performed in accordance with the method performed along one axis Xm from a first position K(1, 1, . . . , 1), and for example, in the case where it is performed along an axis X1, a next position becomes K(2, 1, . . . , 1), and in the case where it is performed along an axis Xm, a next position becomes K(1, 1, . . . , 2), and at the selection and determination of the symbol a, a symbol different from an array element E(*, *, . . . , *) at a different already set position with respect to the position K(*, *, . . . , *) is selected, and further, the symbol a in which the symbol a at the former position K(*, *, . . . , *) of the same line along each axis of the position K(*, *, . . . , *) has an element different from that at a different position on each axis is selected, and therefore, the creation of the table T is achieved by repeating this.

Besides, in order to achieve the above object, a creation method of a table according to a second invention is a creation method of a table for searching for and creating a new m-dimensional and n-order table on the basis of an existing m-dimensional (m is a natural number of 4 or larger) and n-order (n is a natural number of 2 or larger) table, in which a symbol A={a1, a2, . . . , an} of n elements different from each other appears once in an axial direction of each of m reference axes, and is characterized by comprising a first step of setting the existing m-dimensional and n-order table, and determining and setting a permutation of the symbol of the n elements and a selecting sequence in accordance with this permutation, a second step of arranging a symbol after successively returning along each axis in a direction toward a head position from an arbitrary position of each of them axes of the existing table to a position where a symbol lower in the selecting sequence than a symbol of an array element of the existing table can be selected, and a third step of, after the symbol is arranged at the position where the symbol can be selected, selecting and determining a symbol as an array element in the selecting sequence at each position along each axis from the position where the symbol is arranged to a final position, so that it does not become a same symbol as an already determined array element at the former position of each axis. A creation apparatus of a table, a creation program and a creation program storage medium according to a fifth, a ninth and a twelfth invention have the same structure as the second invention.

In the second, the fifth, the ninth and the twelfth invention, selection and determination is performed from a next element in the selecting sequence of an element E(n, n, . . . , n) set at an arbitrary position K(n, n, . . . , n), and in the case where at a position K(*, *, . . . , *,), there occurs a state in which there is no symbol a which can be selected and determined, a return is made to a position one before, and selection and determination of a new element is performed by changing an already determined symbol a as an array element E(*, *, . . . , *,) at this position to a next symbol a in the selecting sequence, and in the case where setting has been capable of being performed, the selection and determination is performed from a first one in the selecting sequence of the elements at the next position, and in the case where the selection and determination is performed to the final position, and the elements are set at all positions, the table is completed.

In case an element which can be arranged runs short, and the selection and determination is performed to the final element at the head position, a more table can not be created, and an existing table T' used for that is the final table to be created, that is, a maximum table T in the sequence. In that case, if further creation is made, a first element is arranged from the first position, so that creation of a new table can be continuously repeated endlessly. Incidentally, the above arbitrary position K(n, n, . . . , n) naturally includes the final position.

Besides, in order to achieve the above object, a creation method of a table according to a third invention is a creation method of a table for searching for and creating a new m-dimensional and n-order table on the basis of an existing m-dimensional (m is a natural number of 4 or larger) and n-order (n is a natural number of 2 or lager) standard table, in which a symbol A={a1, a2, . . . , an} of n elements different from each other appears once in an axial direction of each of m reference axes, and is characterized by comprising a first step of setting an existing standard table in which elements at a line of positions on each of m-dimensional and n-order axes form a line in a selecting sequence, and determining and setting a permutation of the symbol of the n elements and a selecting sequence in accordance with this permutation, a second step of arranging a symbol after successively returning along each axis in a direction toward a head position from an arbitrary position except for a head element position on each axis, which can not be changed since it forms a standard form of the existing table, to a position where a symbol lower in the selecting sequence than a symbol of an array element of the existing table can be selected, and a third step of, after the symbol is arranged at the position where the symbol can be selected, selecting and determining a symbol as an array element in the selecting sequence at each position along each axis from the position where the symbol is arranged to a final position, so that it does not become a same symbol as an already determined array element at a former position of each axis. A creation apparatus of a table, a creation program and a creation program storage medium according to a sixth, a tenth, and a thirteenth invention have the same structure as the third invention. In the third, the sixth, the tenth and the thirteenth invention, the standard table can be created by the regular method on the basis of the existing standard table.

Besides, in order to achieve the above object, a seventh invention is characterized in that the table stored in a memory according to the fourth to the sixth invention is stored as a table having an m-dimensional and n-order data structure in which a position of an array element on each axis of the table is assigned to a storage location with a serial number.

This invention is to cause a table T and an existing table T' to have a data structure to be arranged in locations provided with serial numbers such as a memory of a computer. That is, a processing can be successively performed by arranging positions of array elements in a memory in sequence like K(1, 1, . . . , 1), K(1, 1, . . . , 2), K(1, 1, . . . , 3), . . . , K(n, n, . . . , n).

Besides, m axes X1 to Xm represented in the m dimensions are expressed as a position K(X1, X2, . . . , Xm) of an element, and when positions of elements are made K(1, 1, . . . , 1, n) and an axis is made Xm, the n elements on the same axis can be expressed as E(1, 1, . . . , 1, 1) to E(1, 1, . . . , 1, n). Similarly, when the position of the element is made K(1, 1, . . . , 1, 1) and the axis is made X1, they can be expressed as E(1, 1, . . . , 1, 1) to E(n, 1, . . . , 1, 1).

BRIEF DESCRIPTION OF THE DRAWINGS

FIG. 2 shows a view for explaining an arrangement of a table of the invention into a memory of a computer.

FIG. 7 shows a view showing respective examples of 4-order Latin squares.

FIG. 9 shows a view for explaining respective examples of advancing directions of positions of elements of a table created by a conventional method.

Figure 11:
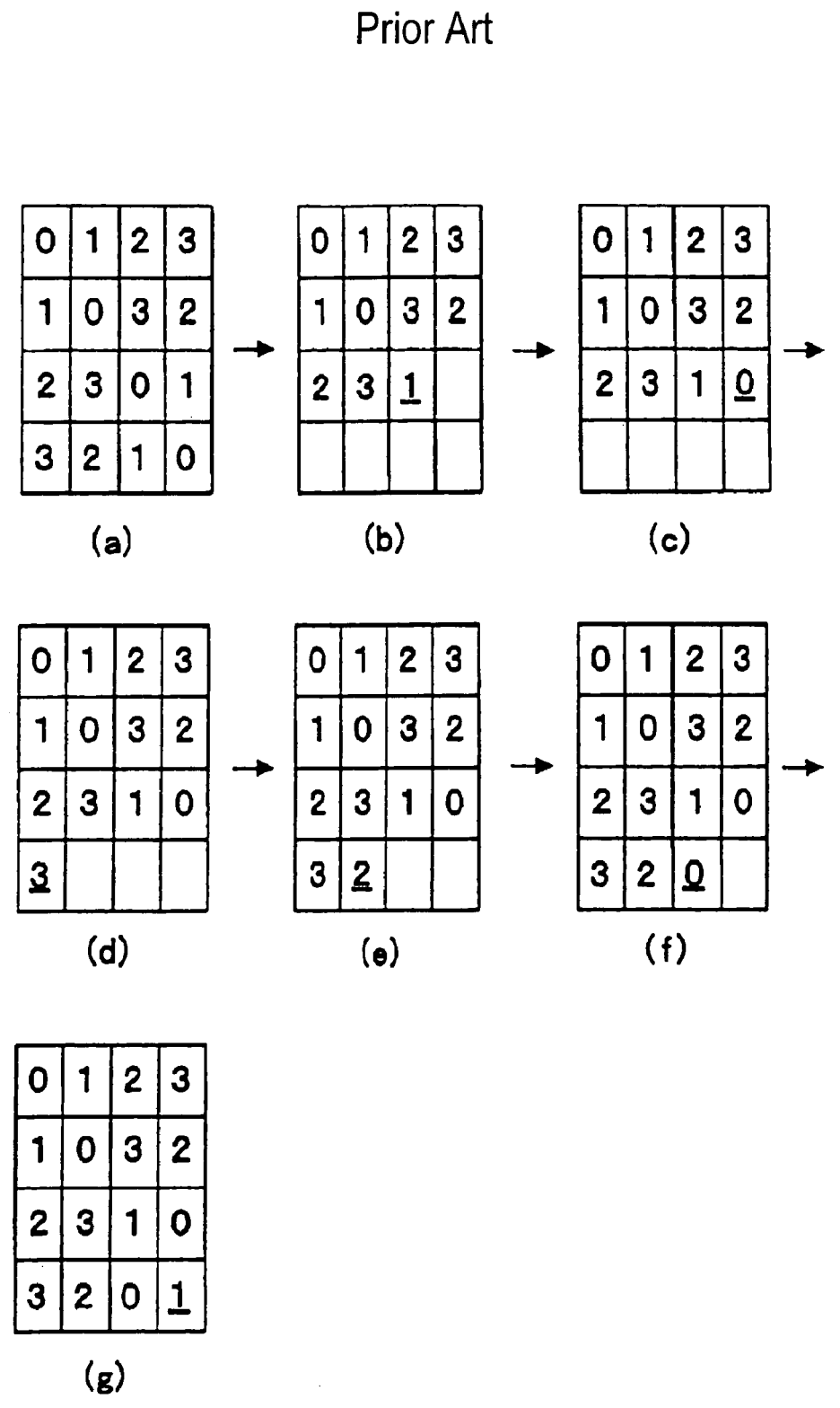

FIG. 11 shows an explanatory view of an example of a creation process for creating another Latin square from an existing Latin square by a conventional method.

DESCRIPTION OF THE PREFERRED EMBODIMENTS

Figure 1:
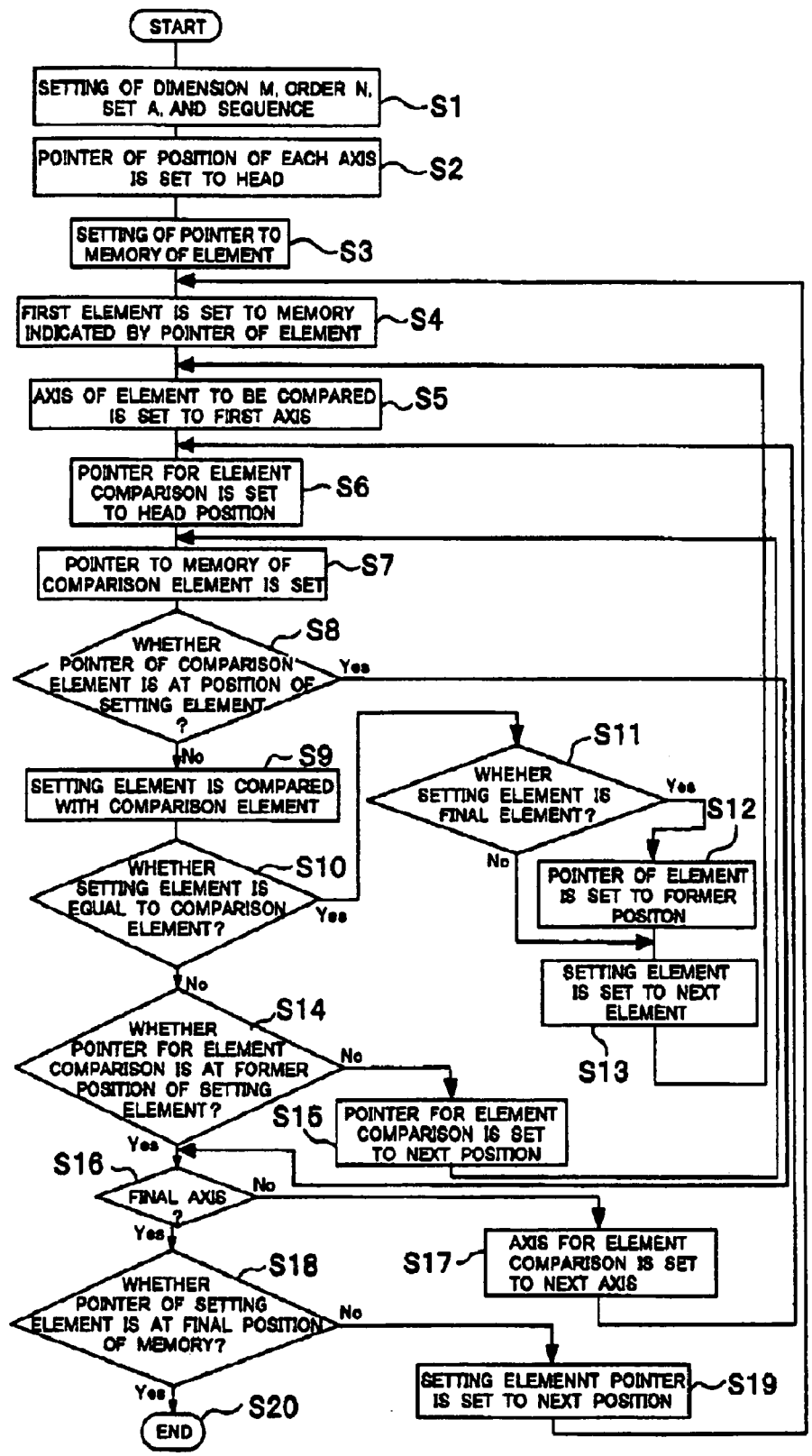
FIG. 1 shows a flowchart for explaining an operation of a first embodiment of the invention.

Next, a mode for carrying the invention will be described with reference to the drawings. Here, each element of a set A={a1, . . . , an} consisting of n symbols is used m times, and $n^m$ elements in total are arranged in an m-dimensional matrix having n elements, and a two-dimensional table in which each element of A appears once in a direction of each of m axes Xm where a reference angle is made a vertex, is called a Latin square on A or an n-order Latin square, and a three-dimensional table is called a Latin cube on A or an n-order Latin cube, as described before. Also with respect to a table of 0-dimensional or one-dimensional arrangement, it can be considered similarly to the two or larger dimensions, though it is exceptional. It is conceivable that the 0-dimensional table is a one-order one having one element, and a one-dimensional and n-order table is a permutation having n elements on one axis.

However, with respect to an m-dimensional table with four or more dimensions, even its existence is not clear, and its name is not particularly determined, and therefore, in this specification, it will be called an m-dimensional Latin cell on A or an m-dimensional and n-order Latin cell. Besides, in two or higher dimensions, with respect to a table having n elements in one of axial directions and having elements, whose number is smaller than n, in a different direction, a two-dimensional one will be called a Latin rectangle, a three-dimensional one will be called a Latin cuboid, and a four-dimensional or higher one will be called a Latin oblong cell.

Further, in this specification, they will be generally called an m-dimensional Latin table on A or an m-dimensional and n-order Latin table. Besides, one in which a symbol of elements is a natural permutation on each of all reference axes, will be called a standard form. Besides, a first one arranged in accordance with the sequence of elements will be called a basic form or a minimum form, and a final one arranged in accordance with the sequence of elements will be called a maximum form.

Since it is difficult to graphically exhibit a four-dimensional or higher Latin table, in this specification, an element of an m-dimensional table is expressed by $E(a_1, a_2, \ldots, a_m)$. By this expression, layout on a memory of a computer is possible. Although a one-dimensional and n-order table is described as E(1) to E(n), this is merely a permutation of elements A, and the total number is expressed as $n! \cdot L1(n)$.

The number L1(n) of standard forms in which a symbol list of elements becomes a natural permutation is one in any order n. That is, L1(1)=1, L1(2)=1, L1(3)=1, L1(4)=1, ..., L1(n)=1.

Besides, a one-dimensional and one-order Latin table on a set A={1} consisting of one symbol is described as $$E(1)=1,$$

and a one-dimensional and two-order Latin table on a set A={1, 2} consisting of two symbols is described as $$E(1)=1, E(2)=2.$$

Since any symbols of these elements are natural permutations, they are standard forms. When it is assumed that a one-dimensional and n-order standard Latin table is composed of n elements (symbols) of A={1, 2, ..., n}, it is expressed as E(*)=*, *=1 to n.

Besides, when it is assumed that a two-dimensional and n-order standard Latin table consists of n elements (symbols) of A={1, 2, ..., n}, it is expressed as E(1, *)=*, E(*, 1)=*, *=1 to n. Further, when it is assumed that a three-dimensional and n-order standard Latin table consists of n elements (symbols) of A={1, 2, ..., n}, elements on each axes are expressed as E(1, 1, *)=*, E(1, *, 1)=*, E(*, 1, 1)=*, where *=1 to n.

With respect to a four-dimensional Latin cell, although its existence has not been known hitherto, the present inventor has obtained it by a following method. A four-dimensional and one-order Latin cell on A={1} having a first-order element is expressed as follows. E(1, 1, 1, 1)=2, E(1, 1, 1, 2)=2, E(1, 1, 2, 1)=2, E(1, 1, 2, 2)=1, E(1, 2, 1, 1)=2, E(1, 2, 1, 2)=1, E(1, 2, 2, 1)=1, E(1, 2, 2, 2)=2, E(2, 1, 1, 1)=2, E(2, 1, 1, 2)=1, E(2, 1, 2, 1)=1, E(2, 1, 2, 2)=2, E(2, 2, 1, 1)=1, E(2, 2, 1, 2)=2, E(2, 2, 2, 1)=2, E(2, 2, 2, 2)=1.

Further, a four-dimensional and three-order Latin cell on A={1, 2, 3} having third-order elements is expressed as follows. E(1, 1, 1, 1)=1, E(1, 1, 1, 2)=2, E(1, 1, 1, 3)=3, E(1, 1, 2, 1)=2, E(1, 1, 2, 2)=3, E(1, 1, 2, 3)=1, E(1, 1, 3, 1)=3, E(1, 1, 3, 2)=1, E(1, 1, 3, 3)=2, E(1, 2, 1, 1)=2, E(1, 2, 1, 2)=3, E(1, 2, 1, 3)=1, E(1, 2, 2, 1)=3, E(1, 2, 2, 2)=1, E(1, 2, 2, 3)=2, E(1, 2, 3, 1)=1, E(1, 2, 3, 2)=2, E(1, 2, 3, 3)=3, E(1, 3, 1, 1)=3, E(1, 3, 1, 2)=1, E(1, 3, 1, 3)=2, E(1, 3, 2, 1)=1, E(1, 3, 2, 2)=2, E(1, 3, 2, 3)=1, E(1, 3, 3, 1)=2, E(1, 3, 3, 2)=3, E(1, 3, 3, 3)=1, E(2, 1, 1, 1)=2, E(2, 1, 1, 2)=3, E(2, 1, 1, 3)=1, E(2, 1, 2, 1)=3, E(2, 1, 2, 2)=1, E(2, 1, 2, 3)=2, E(2, 1, 3, 1)=1, E(2, 1, 3, 2)=2, E(2, 1, 3, 3)=3, E(2, 2, 1, 1)=3, E(2, 2, 1, 2)=1, E(2, 2, 1, 3)=2, E(2, 2, 2, 1)=2, E(2, 2, 2, 2)=3, E(2, 2, 2, 3)=1, E(2, 2, 3, 1)=1, E(2, 2, 3, 2)=2, E(2, 2, 3, 3)=3, E(2, 3, 1, 1)=1, E(2, 3, 1, 1)=1, E(2, 3, 1, 2)=2, E(2, 3, 1, 3)=3, E(2, 3, 2, 1)=2, E(2, 3, 2, 2)=3, E(2, 3, 2, 3)=1, E(2, 3, 3, 1)=3, E(2, 3, 3, 2)=1, E(2, 3, 3, 3)=2, E(3, 1, 1, 1)=3, E(3, 1, 1, 2)=1, E(3, 1, 1, 3)=2, E(3, 1, 2, 1)=1, E(3, 1, 2, 2)=2, E(3, 1, 2, 3)=3, E(3, 1, 3, 1)=2, E(3, 1, 3, 2)=3, E(3, 1, 3, 3)=1, E(3, 2, 1, 1)=1, E(3, 2, 1, 2)=2, E(3, 2, 1, 3)=3, E(3, 2, 2, 1)=2, E(3, 2, 2, 2)=3, E(3, 2, 2, 3)=1, E(3, 2, 3, 1)=3, E(3, 2, 3, 2)=1, E(3, 2, 3, 3)=2, E(3, 3, 1, 1)=2, E(3, 3, 1, 2)=3, E(3, 3, 1, 3)=1, E(3, 3, 2, 1)=3, E(3, 3, 2, 2)=1, E(3, 3, 2, 3)=2, E(3, 3, 3, 1)=1, E(3, 3, 3, 2)=2, E(3, 3, 3, 3)=3.

The standard form of a Latin cell has natural permutations on all reference axes, and as an example of a cell having numerals as elements, the standard form of a four-dimensional and three-order Latin cell on A={1, 2, 3} is a Latin cell in which elements on the respective axes are fixed as shown below.

E(1, 1, 1, 1)=1, E(1, 1, 1, 2)=2, E(1, 1, 1, 3)=3, E(1, 1, 2, 1)=2, E(1, 1, 3, 1)=3, E(1, 2, 1, 1)=2, E(1, 3, 1, 1)=3, E(2, 1, 1, 1)=2, E(3, 1, 1, 1)=3.

That is, when it is assumed that a four-dimensional and n-order standard Latin table consists of n elements (symbols) of A={1, 2, ..., n}, elements on the respective axes are expressed as follows.

E(1, 1, 1, *)=*, E(1, 1, *, 1)=*, E(1, *, 1, 1)=*, E(*, 1, 1, 1)=*, where *=1 to n.

Although the number of standard Latin cells in four dimensions and each order is not opened to the public, when the number of n-order standard forms is expressed as L4(n), the total number of n-order Latin cells is expressed as $$\cdot n! \cdot (n-1)! \cdot (n-1)! \cdot (n-1)! \cdot L4(n).$$

Here, the above expression is modified into $$n \cdot (n-1)! \cdot (n-1)! \cdot (n-1)! \cdot (n-1)! \cdot L4(n),$$

and this expression is expressed as $$n \cdot \{(n-1)!\}^4 \cdot L4(n).$$

When n is 4 or less, the value of L4(n) becomes a following value.

When n=1 to 4, the numeral L4(n) of a standard form in each order is successively $$L4(1)=1, L4(2)=1, L4(3)=1, L4(4)=7132,$$

and the total number of Latin cells in each order becomes 1 in first order, 2 in second order, 48 in third order, and 36972288 in fourth order.

Also with respect to a five-dimensional Latin cell, although it has not been known hitherto, according to the method of the invention, it is derived that the five-dimensional Latin cell on A={1} having a first-order element is $$E(1, 1, 1, 1, 1)=1.$$

Although the number of standard Latin cells in five dimensions and each order is not opened to the public, when the number of n-order standard Latin cells is expressed as L5(n), the total number of n-order Latin cells is expressed as $$n! \cdot (n-1)! \cdot (n-1)! \cdot (n-1)! \cdot (n-1)! \cdot L5(n),$$

and when this expression is deformed and arranged, it is expressed as $$n \cdot \{(n-1)!\}^5 \cdot L5(n).$$

Besides, the value of L5(n) becomes a following value when n is 4 or less.

At the time of n=1 to 4, the number of Latin cells L5(n) in each order is successively $$L5(1)=1, \ L5(2)=1, \ L5(3)=1, \ L5(4)=201538000,$$

and the total number of Latin cells in each order is 1 in first order, 2 in second order, 96 in third order, and 6268637952000 in fourth order.

When a five-dimensional and n-order standard Latin table consists of n elements (symbols) of A={1, 2, . . . , n}, elements on the respective axes are expressed as follows.

$E(1, 1, 1, 1, *)=*, E(1, 1, 1, *, 1)=*, E(1, 1, *, 1, 1)=*, E(1, *, 1, 1, 1)=*, E(*, 1, 1, 1, 1)=*$, where $*=1$ to n.

Also with respect to a six-dimensional Latin cell, although it has not been known hitherto, according to the method of the invention, it is derived that a six-dimensional Latin cell on A={1} having a first-order element is $E''(1, 1, 1, 1, 1, 1)=1.$ Although the number of standard Latin cells in six dimensions and each order is not opened to the public, when the number of n-order standard Latin cells is expressed as L6(n), the total number of n-order Latin cells is expressed as $$n! \cdot (n-1)! \cdot (n-1)! \cdot (n-1)! \quad (n-1)! \quad (n-1)! \cdot L6,$$

and when this expression is modified and arranged, it is expressed as $$n \cdot \{(n-1)!\}^6 \cdot L6(n).$$

When n is three or less, it has been obtained by the invention that the value of L6(n) becomes a following value.

At the time of n=1 to 3, the number of Latin cells L6(n) in each order is successively L6(1)=1, L6(2)=1, L6(3)=1, and the total number of Latin cells in each order is 1 in first order, 2 in second order, and 192 in third order.

When a six-dimensional and n-order standard Latin table consists of n elements of A={1, 2, . . . , n}, elements on the respective axes are expressed as follows.

$E(1, 1, 1, 1, 1, *)=*, E(1, 1, 1, 1, *, 1)=*, E(1, 1, 1, *, 1, 1)=*, E(1, 1, *, 1, 1, 1)=*, E(1, *, 1, 1, 1, 1)=*, E(*, 1, 1, 1, 1, 1)=*$, where $*=1$ to n.

Further, although a seven-dimensional Latin cell has not also been known hitherto, according to the method of the invention, it is derived that the seven-dimensional Latin cell on A={1} having a first-order element is $E(1, 1, 1, 1, 1, 1, 1)=1.$ Although the number of standard Latin cells in seven dimensions and each order is not opened to the public, when the number of n-order standard Latin cells is expressed as L7(n), the total number of n-order Latin cells is expressed as $$n! \cdot (n-1)! \cdot (n-1)! \cdot (n-1)! \quad (n-1)! \quad (n-1)! \cdot (n-1)! \cdot L7(n),$$

and when this expression is modified and arranged, it is expressed as $$n \cdot \{(n-1)!\}^7 \cdot L7(n).$$

When n is three or less, it is obtained by the invention that the value of L7(n) becomes a following value. At the time of n=1 to 3, the number of Latin cells L7(n) in each order is successively L7(1)=1, L7(2)=1, L7(3)=1, and the total number of Latin cells in each order is 1 in first order, 2 in second order, and 284 in third order.

When a seven-dimensional and n-order standard Latin table consists of n elements (symbols) of A={1, 2, . . . , n}, elements on the respective axes are E(1, 1, 1, 1, 1, 1, *)=*, E(1, 1, 1, 1, 1, *, 1)=*, E(1, 1, 1, 1, *, 1, 1)=*, E(1, 1, 1, *, 1, 1, 1)=*, E(1, 1, *, 1, 1, 1, 1)=*, E(1, *, 1, 1, 1, 1, 1)=*, E(*, 1, 1, 1, 1, 1, 1)=*, where $*=1$ to n.

Although then umber of standard Latin cells in m dimensions and each order is not opened to the public, when the number of n-order standard forms is expressed as Lm(n), the total number of m-dimensional and n-order Latin cells is expressed as $$n \cdot \{(n-1)!\}^m \cdot Lm(n).$$

Besides, when the dimension m is an arbitrary natural number of one or larger, and when the order n is n=1 to 3, it is expressed as Lm(1)=1, Lm(2)=1, Lm(3)=1. The total number of Latin cells in each dimension is expressed as 1 in one dimension, 2 in two dimensions, $n \cdot 2^m = 3 \cdot 2^m$ in three dimensions.

From the above, when an m-dimensional and n-order standard Latin table consists of n elements (symbols) of A={1, 2, . . . , n}, elements on the respective axes are expressed as follows. E(1, 1, . . . , 1, *)=*, E(1, 1, . . . , *, 1)=*, E(1, 1, . . . , *, 1, 1)=*, . . . , E(1, *, . . . , 1, 1)=*, E'(*, 1, . . . , 1, 1)=*, where $*=1$ to n.

Next, a first embodiment of the invention will be described. FIG. 1 shows a flowchart of the first embodiment of the invention. First, a computer constituting a part of a creation apparatus of a table sets dimension m and order n of a table T to be created, and sets a set A of n symbols a whose number is equal to this order n and a selecting sequence in accordance with a permutation (step S1). Here, at the setting of the permutation and the selecting sequence in accordance with the permutation, a position K(1, 1, . . . , 1) where an array element E(*, *, . . . , *) is first selected and determined, and a sequence in which the array element E(1, 1, . . . , 1) is selected and determined, that is, the setting direction of a matrix (sequence of E(1, 1, . . . , 1, 1), E(1, 1, . . . , 1, 2), . . . , E(2, 2, . . . , 2, 2)) are set.

Where, in the following description, for simplification of the description, when the dimension number m of the table T is made 4, the order n is made 2, the symbols a of elements are made natural numbers {1, 2}, and the permutation of the elements and the selecting sequence are made a natural permutation and its sequence, by the above step S1, in a memory of the computer constituting the part of the creation apparatus of the table T, as shown in FIG. 2, array elements E(1, 1, 1, 1) to E(2, 2, 2, 2) are stored correspondingly to storage locations K(1, 1, 1, 1) to K(2, 2, 2, 2) of array elements as memory addresses. The above array element E(X1, X2, X3, X4) indicates the element denoted by the positions of the X1 axis, X2 axis, X3 axis, and X4 axis, and the value of each axis of X1 to X4 is 1 or 2 because of the two dimensions, and the symbols of the elements are also 1 and 2 of natural numbers.

Besides, the storage locations K(1, 1, 1, 1) to K(2, 2, 2, 2) are memory addresses indicated by serial numbers. That is, K(1, 1, 1, 1)=0, K(1, 1, 1, 2)=1, K(1, 1, 2, 1)=2, K(1, 1, 2, 2)=3, K(1, 2, 1, 1)=4, . . . , K(2, 2, 2, 2)=15. Besides, the selecting sequence of the elements is made 1→2, and the selecting sequence of the axes is made X4→X3→X2→X1. Further, when an after-mentioned comparison element is expressed as E(Y1, Y2, Y3, Y4), the selecting sequence of axes of the comparison element is also set as Y4→Y3→Y2→Y1.

Here, in the program, the storage locations K(1, 1, 1, 1) to K(2, 2, 2, 2) of the table are indicated by serial numbers as set forth above. In the m-dimensional and n-order table, there is one in which the numbers of elements in the respective axial directions are the same (that is, a table having an arrangements of a square or a cube) and one in which the numbers of elements in the respective axial directions are different from each other (that is, a table having an arrangement of a rectangle or a cuboid). In the case of two dimensions and order n, that is, in the case of an n-order Latin square, the representation of the storage location is expressed as P=(X1−1)•n+(X2−1). Where, X1 indicates a position of a first axis, and X2 indicates a position of a second axis. Similarly, in the case of four dimensions and order n, the representation of the storage location is expressed as P=(X1−1)•n•n•n+(X2−1)•n•n+(X3−1)•n+(X4−1).

Next, a pointer indicating a position of each axis Xm of the m axes of the table T is set to a head, that is, is set to "X1=1, X2=1, X3=1, X4=1" (step S2 of FIG. 1), and a pointer to a memory of a set element (that is, a memory address of serial number of the memory) is set (step S3 of FIG. 1). That is, in the above step S3, the pointer P is the above series of storage locations, and as set forth above, it is expressed as $P=(X-1)•n•n•n+(X2-1)•n•n+(X3-1)•n+(X4-1),$ and besides, from X1=1, X2=1, X3=1, X4=1, n=2, the above pointer P becomes 0.

Subsequently, the computer sets the symbol al of the first element in the storage location K(1, 1, ... , 1) of the memory indicated by the pointer P (=0) of the element (step S4 of FIG. 1). Here, in the following description, for the purpose of facilitating the understanding of the description, the specific examples of FIG. 2 and FIG. 3, together with FIG. 1, will be described. Here, since the pointer P obtained at the above step S3 is "0", and the symbol al of the first element set at the step S4 is "1", "1" is set as the array element E(1, 1, 1, 1) stored in the storage location K(1, 1, 1, 1) indicated by the pointer P (=0) of the element of the memory of FIG. 2. The state of the array element of the storage location of the pointer P=0 of this memory is shown at the uppermost left part of FIG. 3.

Subsequently, m axes of elements of the table T to be compared are set in the first axis (that is, X4) of the setting element (step S5 of FIG. 1). Here, since the position of the setting element is X1=1, X2=1, X3=1, X4=1, the comparison element on the X4 axis of the setting element becomes Y1=X1, Y2=X2, Y3=X3, Y4=X4, and since the setting element is E(1, 1, 1, 1), the comparison element is expressed as E(1, 1, 1, Y4). Here, the element on the axis is the element in the case where Y4 is 1 and 2.

Next, the pointer of the position of the comparison element on the axis is set at the head position of the axis (step S6 of FIG. 1). Here, Y4=1 is set. Accordingly, the comparison element is expressed as E(1, 1, 1, 1). Here, the comparison element is the element already set in the storage location (memory address) of the memory indicated by the pointer of the comparison element. The comparison element specifies a more anterior position than the pointer of the presently set setting element. That is, the place is specified in which the element is already specified. As described later, in case the setting position is returned to a former position, the pointer of the comparison element specifies a more anterior position than the returned setting position.

Subsequently, a pointer Q to the memory of the comparison element is set (step S7 of FIG. 1). The pointer Q of the comparison element is expressed as $Q=(Y1-1)•n•n•n+(Y2-1)•n•n+(Y3-1)•n+(Y4-1)$ and besides, because of Y1=1, Y2=1, Y3=1, Y4=1, and n=2, the above pointer Q becomes 0. Accordingly, by the step S7, 0 is set as the memory address where the comparison element is stored.

Subsequently, it is checked whether the pointer Q of the comparison element and the pointer P of the setting element are equal to each other (step S8 of FIG. 1), and the procedure proceeds to step S16 in the case where they are equal, and proceeds to step S9 in the case where they are not equal. At this point of time, because of P=Q=0, the procedure proceeds to step S16, and it is judged whether the axis of the comparison element under check is a final axis, that is, Y1. At this point of time, since the axis of the comparison element is Y4, not Y1, the procedure proceeds to step S17, and after an axis for element comparison is set to a next axis, that is, Y3, the procedure returns to step S6. At this point of time, the value of the adjacent axis Y4 for element comparison becomes a value "1" of the axis X4 of the setting element, and the comparison element is expressed as E(1, 1, Y3, 1).

At step S6, the pointer for element comparison is set to the head position, that is, Y3=1. Accordingly, the comparison element is expressed as E(1, 1, 1, 1). Subsequently, the pointer Q of the comparison element to the memory is set (step S7 of FIG. 1). The pointer Q of the comparison element is obtained by substituting Y1=1, Y2=1, Y3=1, Y4=1, n=2 into the foregoing expression, and the above pointer Q becomes 0.

Subsequently, it is checked whether the pointer Q of the comparison element and the pointer P of the setting element are equal to each other (step S8 of FIG. 1), and at this point of time, because of P=Q=0, the procedure proceeds to step S16, and it is judged whether the axis of the element to be compared and under check is the final axis, that is, Y1. At this point of time, since the axis of the element to be compared is Y3, not Y1, the procedure proceeds to step S17, and after the axis for element comparison is set to a next axis, that is, Y2, the procedure returns to step S6.

In the following, similarly, the processing is performed in sequence of step S6→S7→S8→S16→S17→S6→S7→S8→S16→S17→S6→S7→S8→S16, and at this point of time, since the axis of the element to be compared is Y1, that is, the final axis Y1, the procedure proceeds to step S18, and it is judged whether the pointer P of the setting element is the final position of the memory. Here, since the pointer P of the setting element is 0, not the final pointer 15, the procedure proceeds to step S19, and after the pointer P of the setting element is made 1 of a next position, the procedure returns to step S4. Because of P=1 at this step S4, as shown in FIG. 2, the setting element of the memory is E(1, 1, 1, 2), and the value of the first element, that is, "1" is set. Accordingly, by this, the storage state of the point P=1 of the memory of FIG. 2 is set to the second state from the upper left of FIG. 3.

Subsequently, the axis of the element to be compared is set to the first axis Y4 to produce E(1, 1, 1, Y4) (step S5 of FIG. 1), the pointer for element comparison is set to the head position, that is, Y4=1 (step S6 of FIG. 1), and the pointer Q of the serial number of the memory of the comparison element is set according to the foregoing expression (step S7 of FIG. 1). At this point of time, because of Y1=Y2=Y3=Y4=1, and n=2, setting to Q=0 is performed.

Subsequently, it is checked whether the pointer Q of the comparison element becomes equal to the pointer P of the setting element (step S8 of FIG. 1). At this point of time, because of P=1 and Q=0, both are not equal to each other, and the procedure proceeds to step S9, the setting element E(1, 1, 1, 2) at P=1 and the comparison element E(1, 1, 1, 1) at Q=0 are compared with each other, and it is judged at step s10 whether values of both are equal to each other, and the procedure proceeds to step S11 in the case where they are equal, and the procedure proceeds to step S14 in the case where the are not equal.

Here, because of the setting element E(1, 1, 1, 2)=1, and the comparison element E(1, 1, 1, 1)=1, both are equal to each other, and the procedure proceeds to step S1, it is checked whether the setting element is the final element, and when it is the final element, the procedure proceeds to step S13 via step S12. That is, at step S12, when a symbol is selected in the selecting sequence so that it does not become the same as the symbol of the already determined array element at a line of former positions in the X4 axis direction, it is judged that there is no symbol which can be selected and determined at an arbitrary position, and at step S13, the symbol of the already determined array element at the position one before the arbitrary position is replaced by a selectable symbol lower in the selecting sequence than the symbol, and selection and determination is continued.

However, at this point of time, at the above step S11, since the setting element E(1, 1, 1, 2) is "1" and is judged not to be "2" of the final element, the step S12 is jumped and the procedure proceeds to step S13, and the setting element is set to a next element (symbol which is lower in the selecting sequence and can be selected). By this, the setting element is made E(1, 1, 1, 2)=2. That is, the storage state of the point P=1 of the memory of FIG. 2 is set to the third state from the upper left end of FIG. 3.

Subsequently, the axis of the element to be compared is set to the first axis Y4(step S5). This produces E(1, 1, 1, Y4). Subsequently, the value of the comparison element on the axis is set to the first value "1" at step S6 to produce E(1, 1, 1, 1). Subsequently, at step S7, the pointer Q as the serial number of the memory of the comparison element is set according to the foregoing expression. At this point of time, because of Y1=Y2=Y3=Y4=1 and n=2, setting to Q=0 is performed.

Subsequently, it is checked whether the pointer Q of the comparison element becomes equal to the pointer P of the setting element (step S8 of FIG. 1). At this point of time, because of P=1 and Q=0, both are not equal to each other, and the procedure proceeds to step S9, the setting element E(1, 1, 1, 2) at P=1 and the comparison element E(1, 1, 1, 1) at Q=0 are compared with each other, and it is judged at step S10 whether the values of both are equal to each other. At this point of time, as shown in FIG. 2, the value of the setting element E(1, 1, 1, 2) is "2", the value of the comparison element E(1, 1, 1, 1) is "1", and the values of both are different from each other, and accordingly, the procedure proceeds to step S14.

At step S14, it is judged whether the pointer Q for element comparison is at a position before the pointer P for setting element. At this point of time, because of P=1 and Q=0, the pointer Q for element comparison is at the position before the pointer P for setting element, and the procedure proceeds to step S16, and it is checked whether the axis under check is the final axis, that is, Y1. At this point of time, the axis is the first axis Y4 set at step S5, not equal to Y1, the procedure proceeds to step S17, and after the axis for element comparison is made a next axis, that is, Y3, the procedure returns to step S6. At this point of time, the value of the adjacent axis Y4 for element comparison becomes the value "2" of the X4 axis of the setting element, and the comparison element is expressed as E(1, 1, Y3, 2).

At step S6, the pointer for element comparison is set to the head position, and Y3=1 is produced. That is, the comparison element becomes E(1, 1, Y3, 2)=E(1, 1, 1, 2). Subsequently, at step S7, the pointer Q as the serial number of the memory of the comparison element is set according to the foregoing expression. At this point of time, because of Y1=Y2=Y3=1, Y4=2, and n=2, setting to Q=1 is performed.

Subsequently, it is checked whether the pointer Q of the comparison element becomes equal to the pointer P of the setting element (step S8 of FIG. 1). At this point of time, because of P=1 and Q=1, both are equal to each other, and the procedure proceeds to step S16, and it is judged whether the axis of the comparison element under check is the final axis, that is, Y1. At this point of time, since the axis of the comparison element is Y3, not Y1, the procedure proceeds to step S17, and after the axis for element comparison is set to a next axis, that is, Y2, the procedure returns to step S6. At this point of time, the value of the adjacent axis Y3 for element comparison becomes the value "1" of the X3 axis of the setting element, and the comparison element is expressed as E(1, Y2, 1, 2).

Hereinafter, in the same way, the processing is performed in sequence of step S6→S7→S8→S16→S17→S6→S7→S8→S16, and at this point of time, since the axis of the element to be compared is Y1 and is the final axis Y1, the procedure proceeds to step S18, and it is judged whether the pointer P of the setting element is the final position of the memory. Here, since the pointer P of the setting element is 1, not the final pointer 15, the procedure proceeds to step S19, and after the pointer P of the setting element is made 2 of a next position, the procedure returns to step S4.

At this step S4, because of P=2, as shown in FIG. 2, the setting element of the memory is E(1, 1, 2, 1), and the value of the first element, that is, "1" is set here. Accordingly, by this, the storage state of the point P=2 of the memory of FIG. 2 is set to the fourth state from the upper left of FIG. 3.

Figure 3:
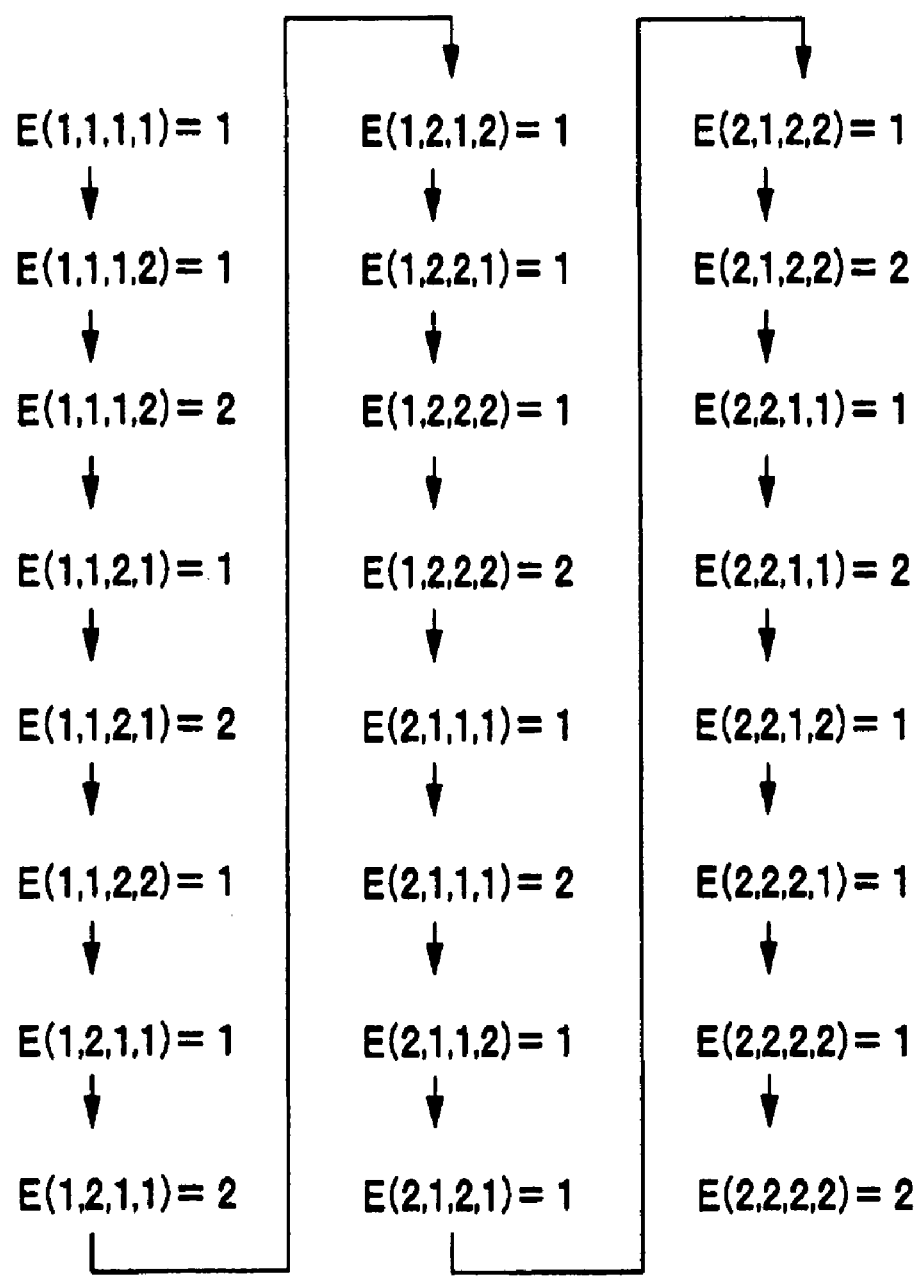
FIG. 3 shows a view showing a change state of setting of elements in a creation process of a four-dimensional and two-order table created in the invention.

Hereinafter, the operation similar to the above is repeated, so that elements are set in sequence shown in FIG. 3 in the respective storage locations of the memory shown in FIG. 2, and when Y1=Y2=Y3=Y4=2 is produced, and the value "2" of the final element is set at the setting element E(2, 2, 2, 2) of the memory, it is judged at step S18 of FIG. 3 that the pointer P of the setting element is at the final position "15" of the memory, and it is judged that the elements are set in all storage locations of the memory (table T), and the creation processing of the table is ended (step S20 of FIG. 3).

As stated above, according to this embodiment, the elements of the four-dimensional and two-order standard table T are arranged in the memory of the computer, which has not been conventionally capable of being performed, and regularly and newly created in accordance with the specific method. By this, the use range of the table T is widened, and the use value and effect of the table T can be remarkably raised.

Figure 4:
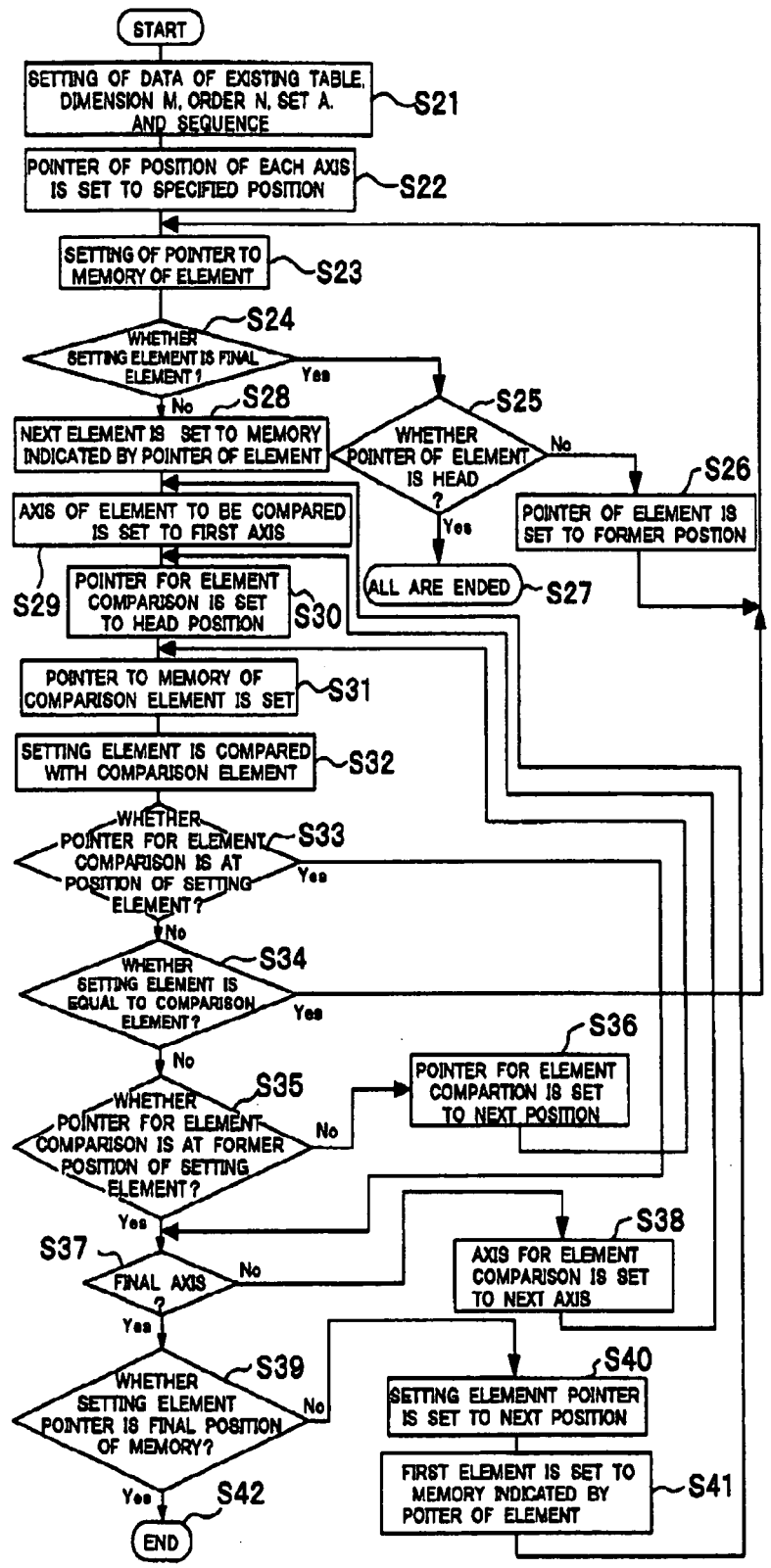
FIG. 4 shows a flowchart for explaining an operation of a second embodiment of the invention.

Next, a second embodiment of the invention will be described. FIG. 4 is a flowchart of the second embodiment of a creation method of a table according to the invention. The second embodiment is a method of creating all tables while the standard and basic table created in the first embodiment is made an existing table. First, a computer sets dimension m and order n of an existing table T stored in a memory, and sets a set A of symbols a for the order n and selecting sequence in accordance with a permutation (step S21 of FIG. 4). Here, at the setting of the permutation and the selecting sequence in accordance with the permutation, a position K(1, 1, . . . , 1) where an array element E(*, *, . . . , *) is selected and determined, and the sequence in which the array element E(1, 1, . . . , 1) is selected and determined, that is, the setting direction of a matrix (sequence of E(1, 1, . . . , 1, 1), E(1, 1, . . . , 1, 2), . . . , E(2, 2, . . . , 2, 2) are first set.

Next, a pointer indicating a position of each axis Xm of m axes of the table T is set to a specified position (step S22 of FIG. 4), and a pointer at a position of an element is set to the memory (step S23 of FIG. 4). Subsequently, it is judged whether the element of the position set in the memory is the element of the final sequence (step S24 of FIG. 4), and the procedure proceeds to step S25 when it is the symbol of the element of the final sequence, and proceeds to step S28 when it is not the symbol of the element of the final sequence. At step S25, it is judged whether the pointer of the element is a head, and when it is the head, it is judged that creation of the table is ended and the creation is ended (step S27 of FIG. 4), and when it is not the head, the pointer of the element is returned to a position one before (step S26 of FIG. 4), and the procedure proceeds to step S23.

On the other hand, at step S28, the symbol of the setting element at the position of the memory indicated by the pointer of the setting element is set to a symbol of a next element. Subsequently, an axis of an element to be compared is set to a first axis (step S29 of FIG. 4), a pointer for element comparison is set to the head position (step S30 of FIG. 4), and a pointer to the memory of the comparison element is set (step S31 of FIG. 4). Subsequently, the symbol of the set element and the symbol of the comparison element on the axis are compared with each other (step S32 of FIG. 4), and it is judged whether the pointer for element comparison indicates the position of the setting element (step S33 of FIG. 4).

When the pointer for element comparison indicates the position of the setting element, the procedure proceeds to step S37, and when it does not indicate, the procedure proceeds to step S34, and it is judged whether the setting element and the comparison element are the same symbol. In the case where a comparison result that the values of the symbols of both are different from each other is obtained at step S34, the procedure proceeds to step S35, and in the case where the values of the symbols are equal to each other, the procedure returns to step S23.

In the case where a comparison result that the values of the symbols of the setting element and the comparison element are different from each other is obtained at the step S34, the procedure proceeds to step S35, and it is judged whether the position of the pointer for element comparison is the position one before on the axis of the setting element, and when it is not the position one before, the procedure proceeds to step S36, the pointer of the comparison element is set to a next position, and the procedure returns to step S31, and when it is the position one before, the procedure proceeds to step S37, and it is judged whether the axis of the setting element is the final axis.

At step S37, when it is judged not to be the final axis, after the axis for element comparison is set to the next axis (step S38 of FIG. 4), the procedure returns to step S30, and when it is judged to be the final axis, it is judged whether the pointer of the setting element is a final position of the memory (table) (step S39 of FIG. 4), and when it is not the final position, the procedure proceeds to step S40, the pointer of the setting element is set to the next position, and after the first element is set in the memory indicated by the pointer of the element (step S41 of FIG. 4), the procedure returns to step S29, and when it is the final position, the symbols of the elements have been arranged at all positions, and the table is completed, and accordingly, the processing is ended (step S42 of FIG. 4).

Figure 5:
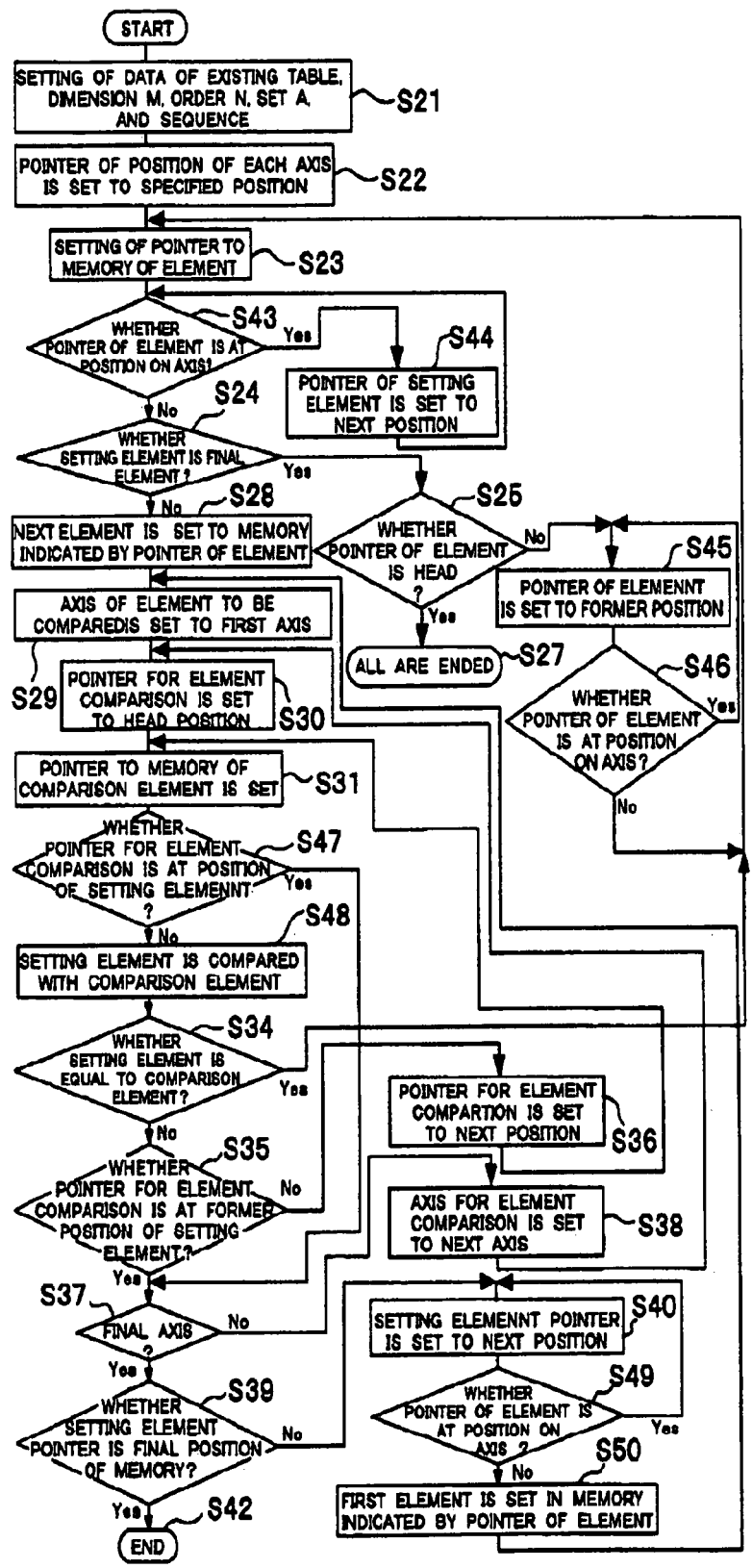
FIG. 5 shows a flowchart for explaining an operation of a third embodiment of the invention.

Next, a third embodiment of the invention will be described. FIG. 5 shows a flowchart of the third embodiment of a creation method of a table according to the invention. In the drawing, the same procedures as those of FIG. 4 are denoted by the same characters, and their description will be omitted. The third embodiment is a method of creating all tables limited to standard forms by using a table created in the first embodiment as an existing table. At the time of creation of a standard table, in each of m-dimensional and n-order axes, the head element position is fixed and is not changed. Thus, arrangement of symbols is started from an arbitrary position except for the position of the head element on each axis, and the symbol is arranged at the positions other than the position of the head element.

In the third embodiment, when the pointer of the setting element is set to the memory at step S23, the computer judges whether the pointer of the setting element set in the memory is at a position on an axis (step S43 of FIG. 5). Here, the position on the axis is the position on a first axis of each of m m-dimensional axes in the standard table, and a position other than this position is called a position not on an axis. For example, in the case of the two-dimensional standard Latin square, respective positions of the first row and the first column are positions on the axis, and in the three-dimensional Latin cube, respective positions of the first row, the first column, and the first line in the depth direction are positions on the axis, and the same applies to the Latin cell. In the case where the four-dimensional or higher standard table is created, the pointer of the position on the first axis is the pointer to the position where the element can be freely arranged in the table. When it is judged at step S43 to beat the position on the axis, after the pointer of the setting element is set to a next position (step S44 of FIG. 5), the procedure returns to the original step S43, and when it is judged not to be at the position on the axis, it is judged whether the setting element is the final element (step S24 of FIG. 5).

When the setting element is not the final element, the procedure proceeds to step S28, and when the setting element is the final element, it is judged whether the pointer of the element is the head (step S25 of FIG. 5), and if it is not the head, the pointer of the element is returned to the position one before (step S45 of FIG. 5), it is judged whether the pointer of the element at the position is the position on the axis (step S46 of FIG. 5), and if it is the position on the axis, the procedure returns to step S45, and further, the pointer of the element is returned to the position one before, and if it is not the position on the axis, the procedure returns to step S23, and the setting of the pointer to the memory of the element is performed.

Besides, at step S31 of FIG. 5, after the pointer to the memory of the comparison element is set, it is checked whether the pointer of the comparison element and the pointer of the setting element are equal to each other (step S47 of FIG. 5), and in the case where they are equal, the procedure proceeds to step S37, and it is judged whether the axis of the element to be compared under check is the final axis, and in the case where they are not equal, the setting element and the comparison element are compared with each other (step S48 of FIG. 5), and it is judged whether the values of both are equal to each other(step S34 of FIG. 5), and in the case where they are equal, the procedure returns to step S23, and in the case where they are not equal, the procedure proceeds to step S35.

Besides, the computer judges whether the setting element pointer is at the final position of the memory (step S38 of FIG. 5), and if it is not at the final position, after the setting element pointer is set at the next position (step S40 of FIG. 5), it is judged whether the pointer of the element is at the position on the axis (step S49 of FIG. 5), and if it is at the position on the axis, the procedure returns to step S40, and the setting element pointer is again set to the next position, and if it is not at the position on the axis, after the first element is set in the memory indicated by the pointer of the element (step S50 of FIG. 5), the procedure returns to step S29, and the axis of the element to be compared is set to the first axis.

Figure 6:
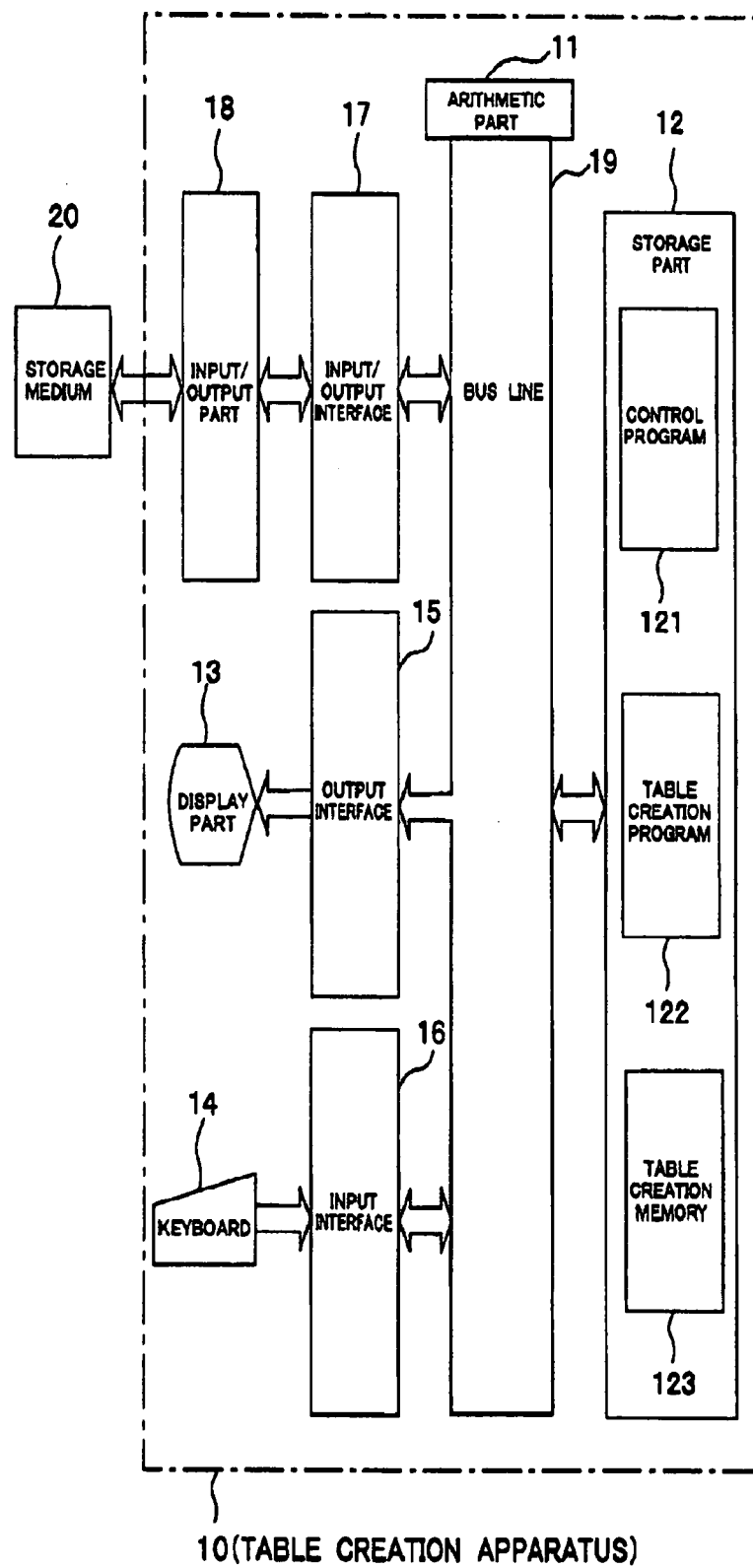
FIG. 6 shows a block diagram of an embodiment of a creation apparatus of a table according to the invention.

Next, an embodiment of a creation apparatus of a table according to the invention will be described. FIG. 6 is a block diagram of the embodiment of the creation apparatus of the table according to the invention. In the drawing, a table creation apparatus 10 includes an arithmetic part 11 for overall controlling respective parts of the table creation apparatus 10 to perform an operation for creation of a table, a storage part 12 for storing a control program 121, a table creation program 122 and a memory 123 for table creation, a display part 13 for displaying various information inputted from the arithmetic part 11 through a bus line 19 and an output interface 15, a keyboard 14 for inputting various information to the arithmetic part 11 through an input interface 16 and the bus line 19, and the like.

Besides, the arithmetic part 11 performs bidirectional transmission/reception of data to a storage medium 20 through the bus line 19, an input/output interface 17 and an input/output part 18. The storage medium 20 is a magnetic disk, an optical disc such as an MO, a CD and a DVD, or the like, and stores the table creation program 122 for causing the arithmetic part 11 to perform the operation in accordance with the flowchart of FIG. 1, 4 or 5 and the control program 121, and they are read out under the control of the arithmetic part 11, and are stored in the storage part 12 through the input/output part 18, the input/output interface 17, and the bus line 19.

The arithmetic part 11 causes the table creation program 122 to operate on the basis of the control program 121, creates a desired m-dimensional and n-order table T by the table creation algorithm in accordance with the flowchart of FIG. 1, 4 or 5, and stores data of the created table in the table creation memory 123. The table data stored in the table creation memory 123 is read out by the arithmetic part 11, and together with the table creation program 122 and/or the control program 121, it is stored through the bus line 19, the input/output interface 17 and the input/output part 18 in the storage medium 20 or a different storage medium mounted to the input/output part 18.

Incidentally, the invention is not limited to the above embodiments, and for example, an existing low dimension table is used to create a new high dimension table constructed by the same elements. For example, a Latin square is prepared as an existing table, the Latin square is put in the vertical direction and the horizontal direction, and in the remaining depth direction, the same elements as elements used in the Latin square are used and are arranged, so that a Latin cube having the same order can be crated. Similarly, it is also possible to create a Latin cell from a Latin cube.

Besides, it is also possible to create a table (which will be called a Latin oblong cell) in which a line of partial elements are removed from a line of elements of each axis of a Latin cell. Besides, in the case where a new table T is created from an existing table T', a certain axis is made a reference axis, and a table T of inverse transformation may be created. In this case, the table T of the inversion transformation can be created by inverting the elements and position information of the existing table T'. However, in the table T of the oblong cell, with respect to a reference axis, it is necessary that all of n elements are arranged in the table.

Effect of the Invention:

As described above, according to the first, the fourth, the eighth and the eleventh invention, elements of a standard table in m dimensions of four or higher dimensions and order n, which have not been conventionally capable of being realized, can be created by using a computer in accordance with the specific method regularly, newly, certainly and simply. By this, the use range of the table is widened, and the use value and effect of the table T can be remarkably raised.

Besides, according to the second, the fifth, the ninth, and the twelfth invention, on the basis of an existing table, all of the tables of the same dimensional number and order and symbols can be regularly created, and by this, the different tables of the same dimensional number and order and symbols can be certainly and simply obtained, and by the creation of the table which has not been capable of being performed until now, the use range is widened, and the use value and the use effect of the table can be remarkably raised.

Besides, according to the third, the sixth, the tenth and the thirteenth invention, on the basis of an existing standard table, all standard tables of the same dimensional number and order can be regularly, certainly and simply created. By this, the use range of the standard table can be widened, and the use value and effect of the standard table can be remarkably raised.

Further, according to the seventh invention, with respect to the table stored in the memory according to the fourth to sixth inventions, the position of the array element on each axis of the table is assigned to a storage location with a serial number, and it is stored as a table having an m-dimension and n-order data structure, and therefore, the data structure of the m-dimensional and n-order table can be easily arranged on the computer.

FIG. 1

START
S1 SETTING OF DIMENSION M, ORDER N, SET A, AND SEQUENCE
S2 POINTER OF POSITION OF EACH AXIS IS SET TO HEAD
S3 SETTING OF POINTER TO MEMORY OF ELEMENT
S4 FIRST ELEMENT IS SET TO MEMORY INDICATED BY POINTER OF ELEMENT
S5 AXIS OF ELEMENT TO BE COMPARED IS SET TO FIRST AXIS
S6 POINTER FOR ELEMENT COMPARISON IS SET TO HEAD POSITION
S7 POINTER TO MEMORY OF COMPARISON ELEMENT IS SET
S8 WHETHER POINTER OF COMPARISON ELEMENT IS AT POSITION OF SETTING ELEMENT?
S9 SETTING ELEMENT IS COMPARED WITH COMPARISON ELEMENT

S10 WHETHER SETTING ELEMENT IS EQUAL TO COMPARISON ELEMENT?
S11 WHETHER SETTING ELEMENT IS FINAL ELEMENT?
S12 POINTER OF ELEMENT IS SET TO FORMER POSITION
S13 SETTING ELEMENT IS SET TO NEXT ELEMENT
S14 WHETHER POINTER FOR ELEMENT COMPARISON IS AT FORMER POSITION OF SETTING ELEMENT?
S15 POINTER FOR ELEMENT COMPARISON IS SET TO NEXT POSITION
S16 FINAL AXIS?
S17 AXIS FOR ELEMENT COMPARISON IS SET TO NEXT AXIS
S18 WHETHER POINTER OF SETTING ELEMENT IS AT FINAL POSITION OF MEMORY?
S19 SETTING ELEMENT POINTER IS SET TO NEXT POSITION
S20 END

FIG. 4
START
S21 SETTING OF DATA OF EXISTING TABLE, DIMENSION M, ORDER N, SET A, AND SEQUENCE
S22 POINTER OF POSITION OF EACH AXIS IS SET TO SPECIFIED POSITION
S23 SETTING OF POINTER TO MEMORY OF ELEMENT
S24 WHETHER SETTING ELEMENT IS FINAL ELEMENT?
S25 WHETHER POINTER OF ELEMENT IS HEAD?
S26 POINTER OF ELEMENT IS SET TO FORMER POSITION
S27 ALL ARE ENDED
S28 NEXT ELEMENT IS SET TO MEMORY INDICATED BY POINTER OF ELEMENT
S29 AXIS OF ELEMENT TO BE COMPARED IS SET TO FIRST AXIS
S30 POINTER FOR ELEMENT COMPARISON IS SET TO HEAD POSITION
S31 POINTER TO MEMORY OF COMPARISON ELEMENT IS SET
S32 SETTING ELEMENT IS COMPARED WITH COMPARISON ELEMENT
S33 WHETHER POINTER FOR ELEMENT COMPARISON IS AT POSITION OF SETTING ELEMENT?
S34 WHETHER SETTING ELEMENT IS EQUAL TO COMPARISON ELEMENT?
S35 WHETHER POINTER FOR ELEMENT COMPARISON IS AT FORMER POSITION OF SETTING ELEMENT
S36 POINTER FOR ELEMENT COMPARISON IS SET TO NEXT POSITION
S37 FINAL AXIS?
S38 AXIS FOR ELEMENT COMPARISON IS SET TO NEXT AXIS
S39 WHETHER SETTING ELEMENT POINTER IS FINAL POSITION OF MEMORY?
S40 SETTING ELEMENT POINTER IS SET TO NEXT POSITION
S41 FIRST ELEMENT IS SET TO MEMORY INDICATED BY POINTER OF ELEMENT
S42 END

FIG. 5
START
S21 SETTING OF DATA OF EXISTING TABLE, DIMENSION M, ORDER N, SET A, AND SEQUENCE
S22 POINTER OF POSITION OF EACH AXIS IS SET TO SPECIFIED POSITION
S23 SETTING OF POINTER TO MEMORY OF ELEMENT
S43 WHETHER POINTER OF ELEMENT IS AT POSITION ON AXIS?
S44 POINTER OF SETTING ELEMENT IS SET TO NEXT POSITION
S24 WHETHER SETTING ELEMENT IS FINAL ELEMENT?
S25 WHETHER POINTER OF ELEMENT IS HEAD?
S45 POINTER OF ELEMENT IS SET TO FORMER POSITION
S46 WHETHER POINTER OF ELEMENT IS AT POSITION ON AXIS?
S27 ALL ARE ENDED
S28 NEXT ELEMENT IS SET TO MEMORY INDICATED BY POINTER OF ELEMENT
S29 AXIS OF ELEMENT TO BE COMPARED IS SET TO FIRST AXIS
S30 POINTER FOR ELEMENT COMPARISON IS SET TO HEAD POSITION
S31 POINTER TO MEMORY OF COMPARISON ELEMENT IS SET
S47 WHETHER POINTER FOR ELEMENT COMPARISON IS AT POSITION OF SETTING ELEMENT?
S48 SETTING ELEMENT IS COMPARED WITH COMPARISON ELEMENT
S34 WHETHER SETTING ELEMENT IS EQUAL TO COMPARISON ELEMENT?
S35 WHETHER POINTER FOR ELEMENT COMPARISON IS AT FORMER POSITION OF SETTING ELEMENT
S36 POINTER FOR ELEMENT COMPARISON IS SET TO NEXT POSITION
S37 FINAL AXIS?
S38 AXIS FOR ELEMENT COMPARISON IS SET TO NEXT AXIS
S39 WHETHER SETTING ELEMENT POINTER IS FINAL POSITION OF MEMORY?
S40 SETTING ELEMENT POINTER IS SET TO NEXT POSITION
S49 WHETHER POINTER OF ELEMENT IS AT POSITION ON AXIS?
S50 FIRST ELEMENT IS SET IN MEMORY INDICATED BY POINTER OF ELEMENT
S42 END

FIG. 6
20 STORAGE MEDIUM
18 INPUT/OUTPUT PART
13 DISPLAY PART
14 KEYBOARD
17 INPUT/OUTPUT INTERFACE
15 OUTPUT INTERFACE
16 INPUT INTERFACE
11 ARITHMETIC PART
19 BUS LINE
12 STORAGE PART
121 CONTROL PROGRAM
122 TABLE CREATION PROGRAM
123 TABLE CREATION MEMORY
10 TABLE CREATION APPARATUS

Figure 8:
FIG. 8 shows an explanatory view showing an example of a standard Latin square.
Figure 10:
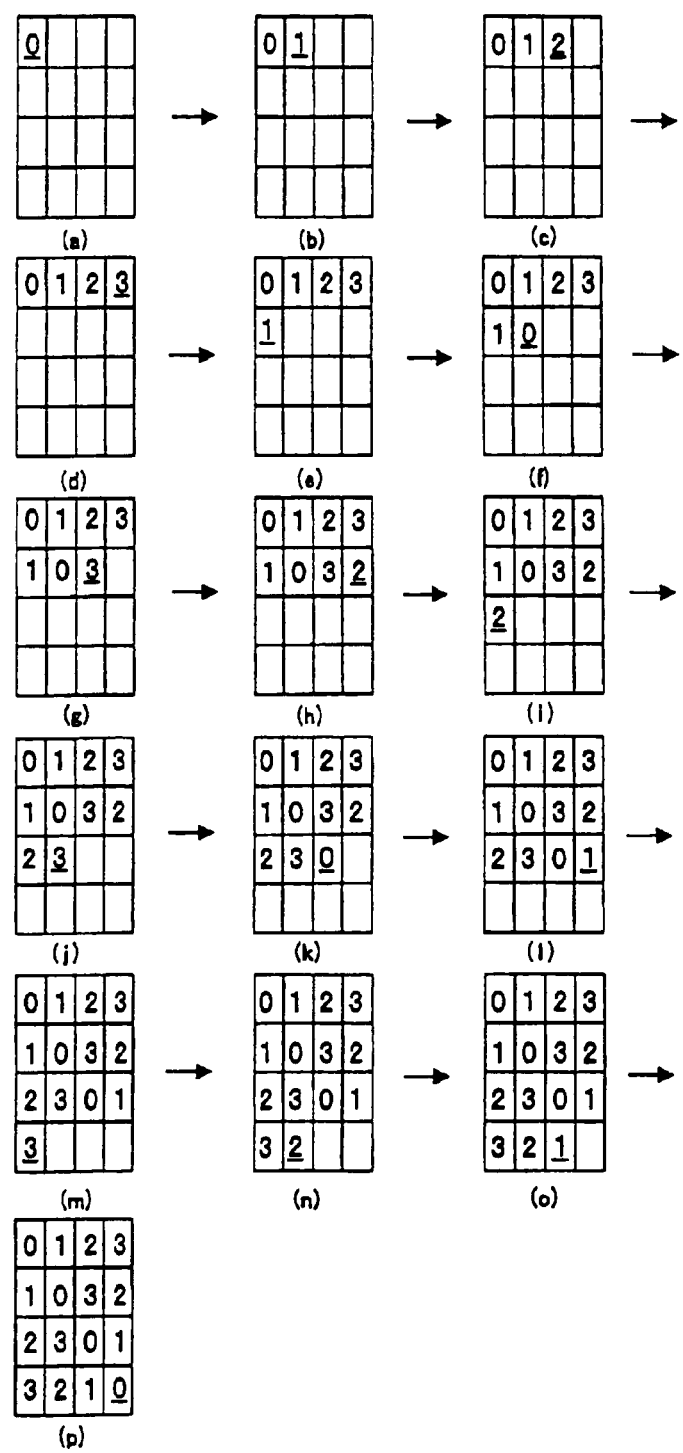
FIG. 10 shows an explanatory view of an example of a creation process for creating a new Latin square by a conventional method.

FIG. 8
VALUE IN SEQUENCE OF 1 TO 4
IT IS ASSUMED THAT ARBITRARY VALUE FORMING LATIN SQUARE IS SET AS VALUE OF ELEMENT OF

FIG. 9
(a) CREATION METHOD IN COLUMN DIRECTION CREATION OF EACH ELEMENT IS PERFORMED IN SEQUENCE OF FIRST ROW AND FIRST COLUMN, FIRST ROW AND SECOND COLUMN, . . . , FOURTH ROW AND THIRD COLUMN, AND FOURTH ROW AND FOURTH COLUMN
(b) CREATION METHOD IN ROW DIRECTION CREATION OF EACH ELEMENT IS PERFORMED IN SEQUENCE OF FIRST ROW AND FIRST COLUMN, SECOND ROW AND FIRST COLUMN, . . . , THIRD ROW AND FOURTH COLUMN, AND FOURTH ROW AND FOURTH COLUMN

What is claimed is:

1. A method of creating a table for searching for and creating an m-dimensional and n-order table in which on the basis of m (m is a natural number of 4 or larger) reference axes, a symbol A={a1, a2, . . . , an} of n (n is a natural number of 2 or larger) elements different from each other appears once in an axial direction of each of the m reference axes, the method of creating a table comprising: a first step of setting the dimension number m and the order n, and determining and setting a permutation of the symbol A of the n elements and a selecting sequence in accordance with the permutation; a second step of, when one of the n elements is set as an array element at each position of the table, starting this setting from a first position of all the reference axes and successively performing said setting to a final position of all the reference axes, and selecting the symbol in the selecting sequence at each position so that said selected symbol does not coincide with the symbol of the already determined array element at a line of former positions in each axial direction; a third step of, when the symbol is selected in the selecting sequence at each position of the table so that said selected symbol does not become coincident with the already determined array element at the line of the former positions in each axial direction, and when no symbol remains which can be selected at an arbitrary position, continuing selection and determination by replacing the symbol of the already determined array element at a position one before the arbitrary position by a selectable symbol lower in the selecting sequence than the symbol; and a fourth step of outputting to a user the table created by the first, second and third steps.

2. A method of creating a table for searching for and creating a new m-dimensional and n-order table on the basis of an existing m-dimensional (m is a natural number of 4 or larger) and n-order (n is a natural number of 2 or larger) table, in which a symbol A={a1, a2, . . . , an} of n elements different from each other appears once in an axial direction of each of m reference axes, the method of creating the table comprising:

a first step of setting the existing m-dimensional and n-order table, and determining and setting a permutation of the symbol of the n elements and a selecting sequence in accordance with the permutation;

a second step of arranging a symbol after successively returning along each axis in a direction toward a head position from an arbitrary position of each of the m axes of the existing table to a position where a symbol lower in the selecting sequence than a symbol of an array element of the existing table can be selected;

a third step of, after the symbol is arranged at the position where the symbol can be selected, selecting and determining a symbol as an array element in the selecting sequence at each position along each axis from the position where the symbol is arranged to the final position, so that said selected symbol does not become a same symbol as an already determined array element at a former position of each axis; and a fourth step of outputting the table created by the first, second and third steps.

3. A method of creating a table for searching for and creating a new m-dimensional and n-order table on the basis of an existing m-dimensional (m is a natural number of 4 or larger) and n-order (n is a natural number of 2 or lager) standard table, in which a symbol A={a1, a2, . . . , an} of n elements different from each other appears once in an axial direction of each of m reference axes, the method of creating the table comprising:

a first step of setting the existing standard table in which elements at a line of positions on each of m-dimensional and n-order axes form a line in a selecting sequence, and determining and setting a permutation of the symbol of the n elements and a selecting sequence in accordance with the permutation;

a second step of arranging a symbol after successively returning along each axis in a direction toward a head position from an arbitrary position except for a head element position on each axis, which cannot be changed because said head element forms a standard form of the existing table, to a position where a symbol lower in the selecting sequence than a symbol of an array element of the existing table can be selected;

a third step of, after the symbol is arranged at the position where the symbol can be selected, selecting and determining a symbol as an array element in the selecting sequence at each position along each axis from the position where the symbol is arranged to a final position, so that said selected symbol does not become a same symbol as an already determined array element at a former position of each axis; and a fourth step of outputting the table created by the first, second and third steps.

4. An apparatus for creating a table for searching for and creating an m-dimensional and n-order table in which on the basis of m (m is a natural number of 4 or larger) reference axes, a symbol A={a1, a2, . . . , an} of n (n is a natural number of 2 or larger) elements different from each other appears once in an axial direction of each of the m reference axes, the apparatus for creating the table comprising:

a memory in which the m-dimensional and n-order table is stored;

setting means for setting the dimension number m and the order n, and determining and setting a permutation of the symbol of the n elements and a selecting sequence in accordance with the permutation;

first storage means for, when one of the n elements is set as an array element at a storage location in the memory corresponding to each position of the table, starting the storage of the array element from a storage location of a first position of all the reference axes and successively performing said storage to a storage location of a final position of all the reference axes, and selecting and arranging the symbol in the selecting sequence set by the setting means at each storage location of each position so that said symbol does not coincide with the symbol of the array element already stored in the storage location at a line of former positions in each axial direction; and second storage means for, when the symbol is selected in the selecting sequence at each storage location of each position of the table in the memory so that said symbol does not become coincident with a first symbol and a second symbol of the symbols of the already arranged array elements at storage locations corresponding to the line of the former positions in each axial direction, and when no symbol remains which can be selected and arranged at a storage location of an arbitrary position, continuing selection and arrangement by replacing the symbol of the already determined array element at a storage location of a position one before the storage location of the arbitrary position by a selectable symbol lower in the selecting sequence than the symbol.

5. An apparatus for creating a table for searching for and creating a new m-dimensional and n-order table on the basis of an existing m-dimensional (m is a natural number of 4 or larger) and n-order (n is a natural number of 2 or larger) table, in which a symbol A={a1, a2, ..., an} of n elements different from each other appears once in an axial direction of each of m reference axes, the apparatus for creating the table comprising:

a memory in which the existing m-dimensional and n-order table is stored, and the new m-dimensional and n-order table is stored;

setting means for storing the existing m-dimensional and n-order table in the memory, and determining and setting a permutation of the symbol of the n elements and a selecting sequence in accordance with the permutation;

first storage means for arranging the symbol in a storage location of the memory after successively returning along each axis in a direction toward a head position from an arbitrary position of each of the m axes of the existing table to a position where a symbol lower in the selecting sequence than a symbol of an array element of the existing table can be selected; and second storage means for, after the symbol is arranged at the storage location of the memory corresponding to the position where the symbol can be selected, selecting a symbol as an array element in the selecting sequence and arranging said selected symbol in the corresponding storage location of the memory at each storage location of each position along each axis from the storage location where the symbol is arranged to the storage location corresponding to the final position, so that said selected symbol does not become a same symbol as an array element already arranged in the storage location at a former position of each axis.

6. An apparatus for creating a table for searching for and creating a new m-dimensional and n-order table on the basis of an existing m-dimensional (m is a natural number of 4 or larger) and n-order (n is a natural number of 2 or lager) standard table, in which a symbol A={a1, a2, ..., an} of n elements different from each other appears once in an axial direction of each of m reference axes, the apparatus for creating the table comprising:

a memory in which the existing m-dimensional and n-order table is stored, and the new m-dimensional and n-order table is stored;

setting means for storing the existing standard table, in which elements at a line of positions on each of m-dimensional and n-order axes form a line in a selecting sequence, into the memory, and determining and setting a permutation of the symbol of the n elements and a selecting sequence in accordance with the permutation;

first storage means for arranging a symbol in a storage location of the memory corresponding to a position after successively returning along each axis in a direction toward a head position from an arbitrary position except for a head element position on each axis, which cannot be changed because the head element forms a standard form of the existing table, to the position where a symbol lower in the selecting sequence than a symbol of an array element of the existing table can be selected; and second storage means for, after the symbol is arranged in the storage location of the memory corresponding to the position where the symbol can be selected, selecting and determining a symbol as an array element in the selecting sequence at each storage location of each position along each axis from the position where the symbol is arranged to a storage location corresponding to a final position, so that said selected symbol does not become a same symbol as an array element already determined in the storage location at a former position of each axis, and arranging said selected symbol in the corresponding storage location of the memory.

7. The apparatus for creating a table according to claim 4, wherein the table stored in the memory is stored as the table having an m-dimensional and n-order data structure in which a position of an array element on each axis of the table is assigned to the storage location with a serial number.

8. A program for creating an m-dimensional and n-order table by a computer, in which on the basis of m (m is a natural number of 4 or larger) reference axes, a symbol A={a1, a2, ..., an} of n (n is a natural number of 2 or larger) elements different from each other appears once in an axial direction of each of the m reference axes, the program for creating the table causing the computer to execute:

a first step of setting the dimension number m and the order n, and determining and setting a permutation of the symbol of the n elements and a selecting sequence in accordance with the permutation;

a second step of, when one of the n elements is set as an array element at each position of the table, starting this setting from a first position of all the reference axes and successively performing said setting to a final position of all the reference axes, and selecting the symbol in the selecting sequence at each position so that said selected symbol does not coincide with a symbol of an already determined array element at a line of former positions in each axial direction;

a third step of, when the symbol is selected in the selecting sequence at each position of the table so that said selected symbol does not become coincident with a first symbol and a second symbol of the symbols of the already determined array elements at the line of the former positions in each axial direction, and when no symbol remains which can be selected and determined at an arbitrary position, continuing selection and determination by replacing the symbol of the already determined array element at a position one before the arbitrary position by a selectable symbol lower in the selecting sequence than the symbol; and a fourth step of displaying the table created by the first, second and third steps.

9. A program for creating a table, the program for searching for and creating a new m-dimensional and n-order table by a computer on the basis of an existing m-dimensional (m is a natural number of 4 or larger) and n-order (n is a natural number of 2 or larger) table, in which a symbol A={a1, a2, ..., an} of n elements different from each other appears once in an axial direction of each of m reference axes, the program for creating the table causing the computer to execute:
- a first step of setting the existing m-dimensional and n-order table, and determining and setting a permutation of the symbol of the n elements and a selecting sequence in accordance with the permutation;
- a second step of arranging a symbol after successively returning along each axis in a direction toward a head position from an arbitrary position of each of the m axes of the existing table to a position where a symbol lower in the selecting sequence than a symbol of an array element of the existing table can be selected;
- a third step of, after the symbol is arranged at the position where the symbol can be selected, selecting and determining a symbol as an array element in the selecting sequence at each position along each axis from the position where the symbol is arranged to the final position, so that said selected symbol does not become a same symbol as an already determined array element at a former position of axis; and
- a fourth step of displaying the table created by the first, second and third steps.

10. A program for creating a table, the program searching for and creating a new m-dimensional and n-order table on the basis of an existing m-dimensional (m is a natural number of 4 or larger) and n-order (n is a natural number of 2 or lager) standard table, in which a symbol A={a1, a2, ..., an} of n elements different from each other appears once in an axial direction of each of m reference axes, the program for creating the table causing the computer to execute:
- a first step of setting the existing standard table in which elements at a line of positions on each of m-dimensional and n-order axes form a line in a selecting sequence, and determining and setting a permutation of the symbol of the n elements and a selecting sequence in accordance with the permutation;
- a second step of arranging a symbol after successively returning along each axis in a direction toward a head position from an arbitrary position except for a head element position on each axis, which can not be changed because the head element forms a standard form of the existing table, to a position where a symbol lower in the selecting sequence than a symbol of an array element of the existing table can be selected; and
- a third step of, after the symbol is arranged at the position where the symbol can be selected, selecting and determining a symbol as an array element in the selecting sequence at each position along each axis from the position where the symbol is arranged to a final position, so that said selected symbol does not become a same symbol as an already determined array element at a former position of each axis; and
- a fourth step of displaying the table created by the first, second and third steps.

11. A program storage medium for creating an m-dimensional and n-order table in which on the basis of m (m is a natural number of 4 or larger) reference axes, a symbol A={a1, a2, ..., an} of n (n is a natural number of 2 or larger) elements different from each other appears once in an axial direction of each of the m reference axes, the program storage medium causing a computer to execute:
- a first step of setting the dimension number m and the order n, and determining and setting a permutation of the symbol of the n elements and a selecting sequence in accordance with the permutation;
- a second step of, when one of the n elements is set as an array element at each position of the table, starting this setting from a first position of all the reference axes and successively performing said setting to a final position of all the reference axes, and selecting the symbol in the selecting sequence at each position so that said selected symbol does not coincide with a symbol of an already determined array element at a line of former positions in each axial direction;
- a third step of, when the symbol is selected in the selecting sequence at each position of the table so that said selected symbol does not become coincident with a first symbol and a second symbol of the symbols of the already determined array elements at the line of the former positions in each axial direction, and when no symbol remains which can be selected and determined at an arbitrary position, continuing selection and determination by replacing the symbol of the already determined array element at a position one before the arbitrary position by a selectable symbol lower in the selecting sequence than the symbol; and
- a fourth step of storing the table created by the first, second and third steps.

12. A program storage medium for storing a program for searching for and creating a new m-dimensional and n-order table on the basis of an existing m-dimensional (m is a natural number of 4 or larger) and n-order (n is a natural number of 2 or larger) table, in which a symbol A={a1, a2, ..., an} of n elements different from each other appears once in an axial direction of each of m reference axes, the program storage medium storing the program for causing a computer to execute:
- a first step of setting the existing m-dimensional and n-order table, and determining and setting a permutation of the symbol of the n elements and a selecting sequence in accordance with the permutation;
- a second step of arranging a symbol after successively returning along each axis in a direction toward a head position from an arbitrary position of each of the m axes of the existing table to a position where a symbol lower in the selecting sequence than a symbol of an array element of the existing table can be selected;
- a third step of, after the symbol is arranged at the position where the symbol can be selected, selecting and determining a symbol as an array element in the selecting sequence at each position along each axis from the position where the symbol is arranged to a final position, so that said selected symbol does not become a same symbol as an already determined array element at a former position of each axis; and
- a fourth step of storing the table created by the first, second and third steps.

13. A program storage medium storing a program for searching for and creating a new m-dimensional and n-order table on the basis of an existing m-dimensional (m is a natural number of 4 or larger) and n-order (n is a natural number of 2 or lager) standard table, in which a symbol A={a1, a2, ..., an} of n elements different from each other appears once in an axial direction of each of the m reference axes, the program storage medium causing a computer to execute:
- a first step of setting the existing standard table in which elements at a line of positions on each of m-dimensional and n-order axes form a line in a selecting sequence, and determining and setting a permutation of the symbol of the n elements and a selecting sequence in accordance with the permutation;

a second step of arranging a symbol after successively returning along each axis in a direction toward a head position from an arbitrary position except for a head element position on each axis, which can not be changed since because said head element forms a standard form of the existing table, to a position where a symbol lower in the selecting sequence than a symbol of an array element of the existing table can be selected;

a third step of, after the symbol is arranged at the position where the symbol can be selected, selecting and determining a symbol as an array element in the selecting sequence at each position along each axis from the position where the symbol is arranged to a final position, so that said selected symbol does not become a same symbol as an already determined array element at a former position of each axis; and a fourth step of storing the table created in the first, second and third steps.

14. The apparatus for creating a table according to claim 5, wherein the table stored in the memory is stored as the table having an m-dimensional and n-order data structure in which a position of an array element on each axis of the table is assigned to the storage location with a serial number.

15. The apparatus for creating a table according to claim 6, wherein the table stored in the memory is stored as the table having an m-dimensional and n-order data structure in which a position of an array element on each axis of the table is assigned to the storage location with a serial number.

* * * * *

UNITED STATES PATENT AND TRADEMARK OFFICE
CERTIFICATE OF CORRECTION

PATENT NO.        : 7,228,311 B2
APPLICATION NO. : 10/796034
DATED             : June 5, 2007
INVENTOR(S)       : Toru Ito It is certified that error appears in the above-identified patent and that said Letters Patent is hereby corrected as shown below:

In the Title, please change "CREATION METHOD OF TABLE, CREATION APPARATUS, CREATION PROGRAM AND PROGRAM STORAGE MEDIUM" to --CREATION METHOD OF TABLE, CREATION APPARATUS, CREATION PROGRAM AND CREATION PROGRAM STORAGE MEDIUM--

Column 4, line 50, change "them axes" to --the m axes--

Column 5, line 29, change "lager" to --larger--

Column 8, line 5, please change "E(2,3,1,1)=1, E(2,3,1,1)=1" to --E(2,3,1,1)1--

Column 8, line 37, change "· n! · (n - 1)! · (n - 1)! · (n - 1)! · L4(n)." to
    --n! · (n - 1)! · (n- 1)! · (n - 1)! · L4(n).--

Column 9, line 24, change "E"(1, 1, 1, 1, 1, 1) = 1." should be --E'(1, 1, 1, 1, 1, 1) = 1.--

Column 9, line 30, change "n! · (n - 1)! · (n - 1)! · (n - 1)! (n - 1)! (n - 1)! · L6," to
    --n! · (n - 1)! · (n - 1)! · (n - 1)! · (n- 1)! · (n - 1)! · L6,--

Column 9, line 58, change "n! · (n - 1)! · (n - 1)! · (n · 1)! (n -1)! (n - 1)! · (n - 1)! · L7(n),"
    to --n! · (n - 1)! · (n - 1)! · (n - 1)! · (n - 1)! · (n - 1)! · (n - 1)! · L7(n),--

Column 13, line 16, change "step S1" to --Step S11--

Column 16, line 40, change "beat" to --be at--

Column 17, line 66, change "crated" to --created--

Column 21, line 4, change "ELEMENT OF" to --ELEMENT OF·--

Column 21, lines 13-14, change "CRE-ATION" to --CREATION--

Column 21, line 20, Claim 1, please insert subparagraphs into claim, change:

"1. A method of creating a table for searching for and creating an m-dimensional and n-order table in which on the basis of m (m is a natural number of 4 or larger) reference axes, a symbol A={al, a2, . . . , an) of n (n is a natural number of 2 or larger) elements different from each other appears once in an axial direction of each of the m reference axes, the method of creating a table comprising: a first step of setting the dimension number m and the order n, and determining and setting a permutation of the symbol A of the n

UNITED STATES PATENT AND TRADEMARK OFFICE
CERTIFICATE OF CORRECTION

| | |
|---|---|
| PATENT NO. | : 7,228,311 B2 |
| APPLICATION NO. | : 10/796034 |
| DATED | : June 5, 2007 |
| INVENTOR(S) | : Toru Ito |

It is certified that error appears in the above-identified patent and that said Letters Patent is hereby corrected as shown below:

elements and a selecting sequence in accordance with the permutation; a second step of, when one of the n elements is set as an array element at each position of the table, starting this setting from a first position of all the reference axes and successively performing said setting to a final position of all the reference axes, and selecting the symbol in the selecting sequence at each position so that said selected symbol does not coincide with the symbol of the already determined array element at a line of former positions in each axial direction; a third step of, when the symbol is selected in the selecting sequence at each position of the table so that said selected symbol does not become coincident with the already determined array element at the line of the former positions in each axial direction, and when no symbol remains which can be selected at an arbitrary position, continuing selection and determination by replacing the symbol of the already determined array element at a position one before the arbitrary position by a selectable symbol lower in the selecting sequence than the symbol; and a fourth step of outputting to a user the table created by the first, second and third steps."

to:

--1. A method of creating a table for searching for and creating an m-dimensional and n-order table in which on the basis of m (m is a natural number of 4 or larger) reference axes, a symbol A=(a1, a2, . . . , an) of n (n is a natural number of 2 or larger) elements different from each other appears once in an axial direction of each of the m reference axes, the method of creating a table comprising:

a first step of setting the dimension number m and the order n, and determining and setting a permutation of the symbol A of the n elements and a selecting sequence in accordance with the permutation;

a second step of, when one of the n elements is set as an array element at each position of the table, starting this setting from a first position of all the reference axes and successively performing said setting to a final position of all the reference axes, and selecting the symbol in the selecting sequence at each position so that said selected symbol does not coincide with the symbol of the already determined array element at a line of former positions in each axial direction;

a third step of, when the symbol is selected in the selecting sequence at each position of the table so that said selected symbol does not become coincident with the already determined array element at the line of the former positions in each axial direction, and when no symbol remains which can be selected at an arbitrary position, continuing selection and determination by replacing the symbol of the already determined array element at a position one before the arbitrary position by a selectable symbol lower in the selecting sequence than the symbol; and

UNITED STATES PATENT AND TRADEMARK OFFICE
CERTIFICATE OF CORRECTION

PATENT NO. : 7,228,311 B2  Page 3 of 3
APPLICATION NO. : 10/796034
DATED : June 5, 2007
INVENTOR(S) : Toru Ito It is certified that error appears in the above-identified patent and that said Letters Patent is hereby corrected as shown below:

a fourth step of outputting to a user the table created by the first, second and third steps.--

Column 22, line 9, after "outputting" insert --to a user--

Column 22, line 14, change "lager)" to --larger)--

Column 22, line 43, after "outputting" insert --to a user--

Column 23, line 56, change "lager)" to --larger)--

Column 24, line 36, after "displaying" insert --to a user--

Column 25, line 25, after "displaying" insert --to a user--

Column 25, line 32, change "lager)" to --larger)--

Column 25, line 57, after "displaying" insert --to a user--

Column 26, line 59, change "lager)" to --larger)--

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO.        : 7,228,311 B2
APPLICATION NO.   : 10/796034
DATED             : June 5, 2007
INVENTOR(S)       : Toru Ito It is certified that error appears in the above-identified patent and that said Letters Patent is hereby corrected as shown below:

In the Title, Item [54] and Column 1, lines 1-4 please change "CREATION METHOD OF TABLE, CREATION APPARATUS, CREATION PROGRAM AND PROGRAM STORAGE MEDIUM" to --CREATION METHOD OF TABLE, CREATION APPARATUS, CREATION PROGRAM AND CREATION PROGRAM STORAGE MEDIUM--

Column 4, line 50, change "them axes" to --the m axes--

Column 5, line 29, change "lager" to --larger--

Column 8, line 5, please change "E(2,3,1,1)=1, E(2,3,1,1)=1" to --E(2,3,1,1)1--

Column 8, line 37, change "· n! · (n - 1)! · (n - 1)! · (n - 1)! · L4(n)." to --n! · (n - 1)! · (n- 1)! · (n - 1)! · L4(n).--

Column 9, line 24, change "E"(1, 1, 1, 1, 1, 1) = 1." should be --E'(1, 1, 1, 1, 1, 1) = 1.--

Column 9, line 30, change "n! · (n - 1)! · (n - 1)! · (n - 1)! (n - 1)! (n - 1)! · L6," to --n! · (n - 1)! · (n - 1)! · (n - 1)! · (n- 1)! · (n - 1)! · L6,--

Column 9, line 58, change "n! · (n - 1)! · (n - 1)! · (n · 1)! (n -1)! (n - 1)! · (n - 1)! · L7(n)," to --n! · (n - 1)! · (n - 1)! · (n - 1)! · (n - 1)! · (n - 1)! · (n - 1)! · L7(n),--

Column 13, line 16, change "step S1" to --Step S11--

Column 16, line 40, change "beat" to --be at--

Column 17, line 66, change "crated" to --created--

Column 21, line 4, change "ELEMENT OF" to --ELEMENT OF·--

Column 21, lines 13-14, change "CRE-ATION" to --CREATION--

Column 21, line 20, Claim 1, please insert subparagraphs into claim, change:

"1. A method of creating a table for searching for and creating an m-dimensional and n-order table in which on the basis of m (m is a natural number of 4 or larger) reference axes, a symbol A={al, a2, . . . , an) of n (n is a natural number of 2 or larger) elements different from each other appears once in an axial direction of each of the m reference axes, the method of creating a table comprising: a first step of setting the dimension number m and the order n, and determining and setting a permutation of the symbol A of the n

UNITED STATES PATENT AND TRADEMARK OFFICE
CERTIFICATE OF CORRECTION

| | |
|---|---|
| PATENT NO. | : 7,228,311 B2 |
| APPLICATION NO. | : 10/796034 |
| DATED | : June 5, 2007 |
| INVENTOR(S) | : Toru Ito |

It is certified that error appears in the above-identified patent and that said Letters Patent is hereby corrected as shown below:

elements and a selecting sequence in accordance with the permutation; a second step of, when one of the n elements is set as an array element at each position of the table, starting this setting from a first position of all the reference axes and successively performing said setting to a final position of all the reference axes, and selecting the symbol in the selecting sequence at each position so that said selected symbol does not coincide with the symbol of the already determined array element at a line of former positions in each axial direction; a third step of, when the symbol is selected in the selecting sequence at each position of the table so that said selected symbol does not become coincident with the already determined array element at the line of the former positions in each axial direction, and when no symbol remains which can be selected at an arbitrary position, continuing selection and determination by replacing the symbol of the already determined array element at a position one before the arbitrary position by a selectable symbol lower in the selecting sequence than the symbol; and a fourth step of outputting to a user the table created by the first, second and third steps."

to:

--1. A method of creating a table for searching for and creating an m-dimensional and n-order table in which on the basis of m (m is a natural number of 4 or larger) reference axes, a symbol A=(al, a2, . . . , an) of n (n is a natural number of 2 or larger) elements different from each other appears once in an axial direction of each of the m reference axes, the method of creating a table comprising:

a first step of setting the dimension number m and the order n, and determining and setting a permutation of the symbol A of the n elements and a selecting sequence in accordance with the permutation;

a second step of, when one of the n elements is set as an array element at each position of the table, starting this setting from a first position of all the reference axes and successively performing said setting to a final position of all the reference axes, and selecting the symbol in the selecting sequence at each position so that said selected symbol does not coincide with the symbol of the already determined array element at a line of former positions in each axial direction;

a third step of, when the symbol is selected in the selecting sequence at each position of the table so that said selected symbol does not become coincident with the already determined array element at the line of the former positions in each axial direction, and when no symbol remains which can be selected at an arbitrary position, continuing selection and determination by replacing the symbol of the already determined array element at a position one before the arbitrary position by a selectable symbol lower in the selecting sequence than the symbol; and

UNITED STATES PATENT AND TRADEMARK OFFICE
CERTIFICATE OF CORRECTION

PATENT NO. : 7,228,311 B2
APPLICATION NO. : 10/796034
DATED : June 5, 2007
INVENTOR(S) : Toru Ito It is certified that error appears in the above-identified patent and that said Letters Patent is hereby corrected as shown below:

a fourth step of outputting to a user the table created by the first, second and third steps.--

Column 22, line 9, after "outputting" insert --to a user--

Column 22, line 14, change "lager)" to --larger)--

Column 22, line 43, after "outputting" insert --to a user--

Column 23, line 56, change "lager)" to --larger)--

Column 24, line 36, after "displaying" insert --to a user--

Column 25, line 25, after "displaying" insert --to a user--

Column 25, line 32, change "lager)" to --larger)--

Column 25, line 57, after "displaying" insert --to a user--

Column 26, line 59, change "lager)" to --larger)--

This certificate supersedes the Certificate of Correction issued July 1, 2008.

Signed and Sealed this

Twenty-ninth Day of July, 2008

JON W. DUDAS
*Director of the United States Patent and Trademark Office*